US011631234B2

(12) United States Patent
Cohen et al.

(10) Patent No.: US 11,631,234 B2
(45) Date of Patent: Apr. 18, 2023

(54) AUTOMATICALLY DETECTING USER-REQUESTED OBJECTS IN IMAGES

(71) Applicant: Adobe Inc., San Jose, CA (US)

(72) Inventors: Scott Cohen, Sunnyvale, CA (US); Zhe Lin, Fremont, CA (US); Mingyang Ling, San Francisco, CA (US)

(73) Assignee: Adobe, Inc., San Jose, CA (US)

( * ) Notice: Subject to any disclaimer, the term of this patent is extended or adjusted under 35 U.S.C. 154(b) by 0 days.

(21) Appl. No.: 16/518,810

(22) Filed: Jul. 22, 2019

(65) Prior Publication Data

US 2021/0027083 A1    Jan. 28, 2021

(51) Int. Cl.
  G06K 9/00          (2022.01)
  G06V 10/20         (2022.01)
  G06F 16/535        (2019.01)
  G06K 9/62          (2022.01)

(52) U.S. Cl.
  CPC .......... *G06V 10/255* (2022.01); *G06F 16/535* (2019.01); *G06K 9/623* (2013.01); *G06K 9/6267* (2013.01)

(58) Field of Classification Search
  CPC .... G06K 9/3241; G06K 9/6267; G06K 9/623; G06F 16/535; G06T 7/0002; G06T 3/4046
  See application file for complete search history.

(56) References Cited

U.S. PATENT DOCUMENTS

| | | | |
|---|---|---|---|
| 6,389,168 B2 | 5/2002 | Altunbasak et al. | |
| 6,469,706 B1 | 10/2002 | Syeda-Nahmood | |
| 8,107,726 B2 | 1/2012 | Xu et al. | |
| 8,385,688 B2 | 2/2013 | Gong et al. | |
| 8,818,024 B2 | 8/2014 | Chen et al. | |
| 8,879,855 B2 | 11/2014 | Angelova et al. | |
| 9,129,191 B2 | 9/2015 | Cohen et al. | |
| 9,171,230 B2 | 10/2015 | Jiang et al. | |
| 9,443,316 B1 | 9/2016 | Takeda et al. | |
| 9,495,764 B1 | 11/2016 | Boardman et al. | |
| 9,576,223 B2 | 2/2017 | Aupetit et al. | |

(Continued)

FOREIGN PATENT DOCUMENTS

| CN | 103366178 A | 10/2013 |
|---|---|---|
| CN | 107563494 A | 1/2018 |

(Continued)

OTHER PUBLICATIONS

Ning Xu et al., "Deep GrabCut for Object Selection," published Jul. 14, 2017.

(Continued)

*Primary Examiner* — Sean M Conner
*Assistant Examiner* — Han Hoang
(74) *Attorney, Agent, or Firm* — Keller Preece PLLC

(57) ABSTRACT

The present disclosure relates to an object selection system that accurately detects and optionally automatically selects user-requested objects (e.g., query objects) in digital images. For example, the object selection system builds and utilizes an object selection pipeline to determine which object detection neural network to utilize to detect a query object based on analyzing the object class of a query object. In particular, the object selection system can identify both known object classes as well as objects corresponding to unknown object classes.

20 Claims, 16 Drawing Sheets

(56) References Cited

U.S. PATENT DOCUMENTS

| | | | |
|---|---|---|---|
| 9,619,488 B2* | 4/2017 | Ambardekar | G06K 9/00671 |
| 9,690,778 B2 | 6/2017 | Masuko | |
| 9,720,934 B1 | 8/2017 | Dube et al. | |
| 9,746,981 B2 | 8/2017 | Zachut et al. | |
| 9,858,496 B2* | 1/2018 | Sun | G06K 9/3233 |
| 10,083,171 B1 | 9/2018 | Yang et al. | |
| 10,146,751 B1 | 12/2018 | Zhang | |
| 10,192,129 B2 | 1/2019 | Price et al. | |
| 10,204,289 B2 | 2/2019 | Duan et al. | |
| 10,216,766 B2 | 2/2019 | Lin et al. | |
| 10,410,096 B2 | 9/2019 | Dijkman et al. | |
| 10,496,880 B2 | 12/2019 | Ye | |
| 10,713,794 B2 | 7/2020 | He et al. | |
| 10,740,647 B2 | 8/2020 | Du et al. | |
| 10,893,283 B2 | 1/2021 | Chen et al. | |
| 11,010,605 B2 | 5/2021 | Nord et al. | |
| 11,055,566 B1 | 7/2021 | Pham et al. | |
| 11,107,219 B2 | 8/2021 | Cohen et al. | |
| 11,176,384 B1 | 11/2021 | Yang et al. | |
| 11,182,408 B2 | 11/2021 | Wu et al. | |
| 11,417,097 B2 | 8/2022 | Lin et al. | |
| 11,487,975 B2 | 11/2022 | Kim | |
| 2003/0179213 A1 | 9/2003 | Liu | |
| 2003/0198380 A1 | 10/2003 | Shin et al. | |
| 2003/0233224 A1 | 12/2003 | Marchisio et al. | |
| 2008/0069444 A1 | 3/2008 | Wilensky | |
| 2008/0117209 A1 | 5/2008 | Razeto | |
| 2009/0281925 A1 | 11/2009 | Winter et al. | |
| 2009/0316988 A1 | 12/2009 | Xu et al. | |
| 2010/0158412 A1 | 6/2010 | Wang et al. | |
| 2010/0166321 A1 | 7/2010 | Sawant et al. | |
| 2010/0232643 A1 | 9/2010 | Chen et al. | |
| 2011/0026835 A1 | 2/2011 | Ptucha et al. | |
| 2011/0029553 A1 | 2/2011 | Bogart et al. | |
| 2011/0085739 A1 | 4/2011 | Zhang et al. | |
| 2011/0216973 A1 | 9/2011 | Mojsilovic | |
| 2013/0257886 A1 | 10/2013 | Kerofsky et al. | |
| 2014/0334722 A1 | 11/2014 | Bloore et al. | |
| 2015/0169142 A1 | 6/2015 | Longo et al. | |
| 2015/0170005 A1 | 6/2015 | Cohen et al. | |
| 2015/0213058 A1 | 7/2015 | Ambardekar et al. | |
| 2015/0228086 A1 | 8/2015 | Maurer et al. | |
| 2015/0305609 A1 | 10/2015 | Hoberman et al. | |
| 2015/0379006 A1 | 12/2015 | Dorner et al. | |
| 2016/0342863 A1 | 11/2016 | Kwon et al. | |
| 2017/0017696 A1 | 1/2017 | Alonso | |
| 2017/0083752 A1 | 3/2017 | Saberian et al. | |
| 2017/0140236 A1* | 5/2017 | Price | G06K 9/3241 |
| 2017/0206431 A1 | 7/2017 | Sun et al. | |
| 2017/0255378 A1 | 9/2017 | Desai | |
| 2017/0277948 A1 | 9/2017 | Dhua et al. | |
| 2017/0287137 A1 | 10/2017 | Lin et al. | |
| 2017/0364771 A1 | 12/2017 | Pinheiro et al. | |
| 2018/0089203 A1 | 3/2018 | Soni et al. | |
| 2018/0108137 A1 | 4/2018 | Price et al. | |
| 2018/0121768 A1 | 5/2018 | Lin et al. | |
| 2018/0240243 A1 | 8/2018 | Kim et al. | |
| 2018/0260793 A1 | 9/2018 | Li et al. | |
| 2018/0267997 A1 | 9/2018 | Lin et al. | |
| 2018/0285686 A1 | 10/2018 | Pinheiro et al. | |
| 2019/0019318 A1 | 1/2019 | Cinnamon et al. | |
| 2019/0096125 A1 | 3/2019 | Schulter et al. | |
| 2019/0108250 A1 | 4/2019 | Miller et al. | |
| 2019/0130229 A1 | 5/2019 | Lu et al. | |
| 2019/0252002 A1 | 8/2019 | Ding et al. | |
| 2019/0354609 A1 | 11/2019 | Huang et al. | |
| 2020/0020108 A1 | 1/2020 | Pao et al. | |
| 2020/0074185 A1 | 3/2020 | Rhodes et al. | |
| 2020/0175344 A1* | 6/2020 | Li | G06V 10/764 |
| 2020/0218931 A1 | 7/2020 | Karlinsky et al. | |
| 2020/0242357 A1 | 7/2020 | Brouard et al. | |
| 2020/0250538 A1* | 8/2020 | Li | G06F 16/953 |
| 2020/0294293 A1 | 9/2020 | Boenig, II et al. | |
| 2020/0302230 A1* | 9/2020 | Chang | G06N 3/08 |
| 2020/0334487 A1 | 10/2020 | Du et al. | |
| 2020/0334501 A1 | 10/2020 | Lin et al. | |
| 2020/0349362 A1 | 11/2020 | Maloney | |
| 2021/0027448 A1 | 1/2021 | Cohen et al. | |
| 2021/0027471 A1 | 1/2021 | Cohen et al. | |
| 2021/0027497 A1 | 1/2021 | Ding et al. | |
| 2021/0056713 A1 | 2/2021 | Rangesh et al. | |
| 2021/0192375 A1* | 6/2021 | Xia | G06N 5/04 |
| 2021/0366128 A1 | 11/2021 | Kim et al. | |
| 2021/0397876 A1 | 12/2021 | Hemani et al. | |
| 2022/0084209 A1 | 3/2022 | Wang et al. | |
| 2022/0101531 A1 | 3/2022 | Zhang et al. | |
| 2022/0230321 A1 | 7/2022 | Zhao et al. | |

FOREIGN PATENT DOCUMENTS

| | | |
|---|---|---|
| CN | 112561920 A | 3/2021 |
| DE | 102019102484 A1 | 8/2020 |
| EP | 3 300 024 A1 | 3/2018 |
| WO | WO 2017/007626 A1 | 1/2017 |
| WO | WO 2017/198909 A1 | 11/2017 |
| WO | WO 2019/110583 A1 | 6/2019 |
| WO | WO 2020/101777 A1 | 5/2020 |
| WO | WO 2021/179205 A1 | 9/2021 |

OTHER PUBLICATIONS

S. Ren, K. He, R. Girshick, and J. Sun, Faster r-cnn: Towards real-time object detection with region proposal networks, NIPS, 2015.

Yi-Hsuan Tsai et al., "Sky is Not the Limit: Semantic-Aware Sky Replacement," ACM Transactions on Graphics (SIGGRAPH), 2016.

Yufei Wang et al., "Concept Mask: Large-Scale Segmentation from Semantic Concepts," The European Conference on Computer Vision (ECCV), Aug. 18, 2018.

Combined Search and Examination Report as received in United Kingdom Application GB2005704.8 dated Sep. 24, 2020.

Combined Search and Examination Report as received in United Kingdom Application GB2004362.6 dated Nov. 13, 2020.

Intention to Grant as received in United Kingdom Application GB1817588.5 dated Aug. 13, 2020.

Combined Search and Examination Report as received in United Kingdom Application GB2005714.7 dated Sep. 3, 2020.

J. Uijlings, K. van de Sande, T. Gevers, and A. Smeulders. Selective Search For Object Recognition, IJCV, 2013.

Joseph Redmon, Santosh Divvala, Ross Girshick, Ali Farhadi: You Only Look Once: Unified, Real-Time Object Detection, arXiv: 1506.02640, May 6, 2016.

Bency, Archith John, et al. "Weakly supervised localization using deep feature maps." European Conference on Computer Vision. Springer, Cham, 2016, See Abstract and section 3.4.

Bolanos, Marc, and Petia Radeva. "Simultaneous food localization and recognition." 2016 23rd International Conference on Pattern Recognition (ICPR). IEEE, 2016 See Abstract, Figure 3 and the Methodology section.

Combined Search and Examination Report as received in United Kingdom Application GB1817588.5 dated Apr. 8, 2019.

U.S. Appl. No. 15/921,492, filed Dec. 27, 2019, Office Action.

U.S. Appl. No. 15/921,492, filed Apr. 2, 2020, Notice of Allowance.

Kirillov, Alexander & Girshick, Ross & He, Kaiming & Dollar, Piotr. (2019). Panoptic Feature Pyramid Networks. 6392-6401. 10.1109/CVPR.2019.00656.

Gouet, Valerie, and Nozha Boujemaa. "Object-based queries using color points of interest." Proceedings IEEE Workshop on Content-Based Access of Image and Video Libraries (CBAIVL 2001). IEEE, 2001. (Year: 2001).

Wang, Jiang, et al. "Learning fine-grained image similarity with deep ranking." Proceedings of the IEEE Conference on Computer Vision and Pattern Recognition. 2014. (Year: 2014).

Niblack, Carlton Wayne, et al. "QBIC project: querying images by content, using color, texture, and shape." Storage and retrieval for image and video databases. vol. 1908. International Society for Optics and Photonics, 1993. (Year: 1993).

Wan et al, Deep Learning for Content-Based Image Retrieval: Comprehensive Study, Published in MM '14: Proceedings of the

(56) References Cited

OTHER PUBLICATIONS

ACM International Conference on Multimedia: Nov. 3-7, 2014, Orlando, pp. 157-166. http://doi.org/10.1145/2647868.2654948 (Year: 2014).
Carion, Nicolas et al. "End-to-End Object Detection with Transformers," arXiv preprint arXiv:2005.12872(2020).
U-net architecture and use techniques and approaches found in Olaf Ronneberger et al., "U-Net: Convolutional Networks for Biomedical Image Segmentation," submitted on May 18, 2015, arXiv:1505.049597.
Wang et al. in Joint Object and Part Segmentation using Deep Learned Potentials, In Proc. International Conference on Computer Vision (ICCV), 2015.
J. Dong et al.; Towards Unified Human Parsing And Pose Estimation, In CVPR, pp. 843-850, 2014.
U.S. Appl. No. 16/518,880, filed Dec. 23, 2020, Office Action.
U.S. Appl. No. 16/518,795, filed Jan. 21, 2021, Preinterview 1st Office Action.
Combined Search and Examination Report as received in UK Application GB2005865.7 dated Jan. 11, 2021.
Examination Report as received in Australian application 2018250370 dated Jun. 10, 2021.
U.S. Appl. No. 16/518,880, filed Apr. 7, 2021, Notice of Allowance.
U.S. Appl. No. 16/518,795, filed May 6, 2021, Office Action.
U.S. Appl. No. 16/817,418, filed Mar. 22, 2021, Notice of Allowance.
U.S. Appl. No. 16/518,850, filed Apr. 6, 2021, Preinterview 1st Office Action.
U.S. Appl. No. 16/518,820, filed May 28, 2021, 1st Action Office Action.
U.S. Appl. No. 16/518,850, filed Jun. 18, 2021, Office Action.
U.S. Appl. No. 16/518,795, filed Sep. 15, 2021, Notice of Allowance.
Examination Report as received in United Kingdom application GB2005865.7 dated Sep. 14, 2021.
Examination Report as received in Australian application 2020202658 dated Aug. 23, 2021.
Examination Report as received in Australian application 2020202602 dated Sep. 14, 2021.
Intention to Grant as received in United Kingdom Application GB2005704.8 dated Sep. 30, 2021.
U.S. Appl. No. 16/518,850, filed Nov. 4, 2021, Office Action.
U.S. Appl. No. 16/919,383, filed Feb. 10, 2022, Notice of Allowance.
U.S. Appl. No. 16/800,415, filed Feb. 17, 2022, Preinterview 1st Office Action.
Examination Report as received in Australian application 2020201988 dated Oct. 29, 2021.
U.S. Appl. No. 16/518, filed Dec. 7, 2021, Notice of Allowance.
Examination Report as received in Australian application 2020202602 dated Nov. 22, 2021.
Notice of Grant as received in Australian Application 2020202658 dated Dec. 23, 2021.
Notice of Grant as received in United Kingdom application GB2005704.8 dated Nov. 16, 2021.
Examination Report as received in Australian application 2020202601 dated Nov. 5, 2021.
Examination Report as received in United Kingdom application GB2005865.7 dated Dec. 14, 2021.
Notice of Grant as received in Australian application 2020201988 dated Mar. 17, 2022.
U.S. Appl. No. 16/518,850, filed Jan. 25, 2022, Office Action.
Intention to Grant as received in United Kingdom Application GB2005865.7 dated March 23, 2022.
Intention to Grant as received in United Kingdom Application GB2004362.6 dated Apr. 8, 2022.
U.S. Appl. No. 16/800,415, filed Apr. 4, 2022, 1st Action Office Action.
U.S. Appl. No. 16/518,850, filed Jun. 1, 2022, Notice of Allowance.
U.S. Appl. No. 16/800,415, filed Jul. 20, 2022, Notice of Allowance.
Examination Report as received in Australian application 2020202602 dated Oct. 18, 2021.
Intention to Grant as received in Australian application 2018250370 dated Oct. 21, 2021.
Ahmed et al., Semantic Object Selection, IEEE Conference on Computer Vision and Pattern Recognition (pp. 3150-3157) ( Year: 2014).
Hu et al., Segmentation from Natural Language Expressions, Arxiv:1603.0618 (Year: 2016).
Deng et al, You Only Look & Listen Once: Towards Fast and Accurate Visual Grounding, arXiv:1902.04213 (Year: 2019).
U.S. Appl. No. 17/151,111, dated Oct. 12, 2022, Notice of Allowance.
U.S. Appl. No. 17/387,195, dated Oct. 24, 2022, Office Action.
U.S. Appl. No. 17/158,527, dated Dec. 15, 2022, Office Action.
U.S. Appl. No. 17/331,161, dated Dec. 30, 2022, Office Action.
U.S. Appl. No. 17/387,195, dated Jan. 31, 2023, Office Action.
U.S. Appl. No. 17/331,161, dated Feb. 10, 2023, Notice of Allowance.
U.S. Appl. No. 17/929,206, dated Jan. 19, 2023, Office Action.

* cited by examiner

AUTOMATICALLY DETECTING USER-REQUESTED OBJECTS IN IMAGES

BACKGROUND

Recent years have witnessed a significant increase in digital image editing. Indeed, advances in both hardware and software have increased the ability of individuals to capture, create, and edit digital images. For instance, the hardware on most modern computing devices (e.g., servers, desktops, laptops, tablets, and smartphones) enables digital image editing without significant lag time or processing delays. Similarly, improvements in software enable individuals to modify, combine, filter, or otherwise edit digital images. Examples of editing digital images include detecting an object, copying the object from one image into a new background, or removing an object from an image.

Notwithstanding these improvements in digital image editing, conventional systems have a number of problems in relation to flexibility, accuracy, and efficiency of operation in image editing systems, particularly with respect to detecting and selecting objects in digital images. As an example, many conventional systems have limited functionality in the types of objects they can detect in an image. To provide context, an object in an image can correspond to one or more object types or classes (e.g., foreground objects, background objects, conceptual objects), and object classes can include near limitless numbers of objects. Conventional systems are often limited to a small number of object classes. Further, conventional systems primarily detect only a small subset of objects within an object class. For instance, some conventional systems can detect only dogs in an image, but not other types or classes of objects.

In additional, conventional systems are inaccurate. For instance, many conventional systems that provide object detection often identify the wrong objects or worse, altogether fail to identify any object in an image. For example, many conventional systems do not identify objects that do not belong to well-known object classes.

Also, some conventional systems are inaccurate because they provide imprecise results. For instance, while a few conventional systems can select individual masks of an object, the boundaries of these masks are rough and imprecise. Indeed, these conventional systems often produce object masks that over include additional portions of the image or do not include the entire object. As a result, a user must manually correct the selection and/or manually select the desired object.

These, along with additional problems and issues exist in image editing systems with respect to detecting and selecting objects in digital images.

BRIEF SUMMARY

Embodiments of the present disclosure provide benefits and/or solve one or more of the foregoing or other problems in the art with systems, non-transitory computer-readable media, and methods for automatically selecting detected objects in a digital image based on natural language-based inputs. For instance, the disclosed systems can utilize multiple object detection neural networks and models to accurately detect and automatically select a query object (e.g., an object provided by a user in a selection query). In particular, the disclosed systems can detect objects belonging to both known object classes as well as unknown object classes.

To illustrate, the disclosed systems can identify a query object that a user is requesting to be detected within an image. Utilizing the query object, the disclosed systems can determine whether the query object corresponds to a known object class. Further, based on determining that the query object corresponds to a known class, the disclosed systems can utilize a known object class detection neural network to detect the query object within the image. Alternatively, based on determining that the query object does not correspond to a known class of objects, the disclosed systems can utilize an unknown object class detection neural network to detect the query object. In various more embodiments, known object class detection neural network and the unknown object class detection neural network each include multiple models or additional neural networks, as described below. Upon detecting the query object, the disclosed systems can automatically select and provide the detected query object to the user within the image.

While this summary refers to systems for simplicity, the summary also applies to certain disclosed methods and non-transitory computer-readable media. The following description sets forth additional features and advantages of one or more embodiments of the disclosed systems, computer media, and methods. In some cases, such features and advantages will be evident to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
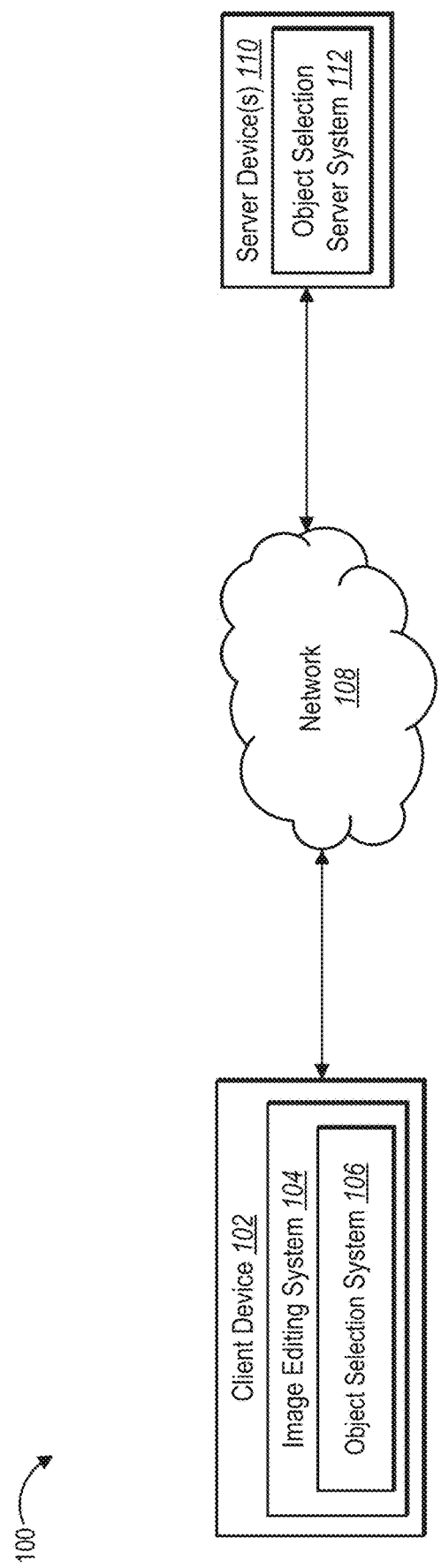
FIG. 1 illustrates a schematic diagram of a system for detecting objects in digital images in accordance with one or more embodiments.

This disclosure describes one or more embodiments of an object selection system that accurately detects and optionally automatically selects query objects (e.g., user-requested objects) in digital images. In particular, in one or more embodiments, the object selection system can determine an object detection neural networks to utilize to detect the query object in the image based on analyzing an object class of the query object. In particular, the object selection system can identify both known object classes as well as objects corresponding to unknown object classes.

To illustrate, in one or more embodiments, the object selection system can identify a query object that a user is requesting to be detected within an image. Based on analyzing the user query, the object selection system can select an object detection neural network of a plurality of object detection neural networks that is best suited to detect the query object. For instance, if the object class of the query object is recognized as a known object class, the object selection system can utilize a known object class detection neural network to detect the query object within the image. Alternatively, if the object class of the query object is not recognized as a known object class, the object selection system can utilize an unknown object class detection neural network to detect the query object within the image. Further, the object selection system can select and provide the query object to the user within the image.

As mentioned above, the object selection system can detect objects corresponding to both known and unknown object classes. In this manner, a user can request that the object selection system find any type of object rather than an object belonging to limited classes. Indeed, in some embodiments, the object selection system utilizes an object selection pipeline that provides a framework for the object selection system to select the object detection neural network that is best suited to detect the query object requested by a user.

To illustrate, in one or more embodiments, can analyze a query object to determine an object type or class. For example, in one or more embodiments, the object selection system can detect that the query object corresponds to a group of known object classes. Alternatively, the object selection system can determine that the query object is associated with an unknown object class. Further, based on the object type or class, the object selection system can determine which object detection neural network or model to utilize to optimally detect the query object.

In other words, in embodiments where the query object corresponds to a known object, the object selection system can utilize a known object class neural network trained to detect known classes of objects that include the known object class. Likewise, in embodiments where the query object corresponds to an unknown object (e.g., the object is not recognized as belonging to a known object class), the object selection system can utilize an unknown object class neural network to detect the query object.

As mentioned above, in one or more embodiments, the object selection system utilizes an object detection neural network that detects objects having known object classes. For example, the object selection system can detect that the query object belongs to a known object class. In general, a known object class detection neural network is trained to identify objects corresponding to various object classes. In some embodiments, the known object class detection neural network can include a region proposal neural network and an object classification neural network. Examples of object classes includes dogs, cars, buildings, bottles, phones, trees roads, etc. In some embodiments, the object selection system identifies a query object by identifying other objects in the image utilizing a known object class detection neural network and filters out the other objects that do not correspond to the query object.

Furthermore, as mentioned above, the object selection system can detect objects having unknown object classes. For example, the object selection system can determine that the query object is not associated with a known object class or other types of objects (e.g., specialty objects, concept objects). In such embodiments, the object selection system can use an unknown object class detection neural network that includes a region proposal neural network and a concept embedding neural network. In these embodiments, the object selection system can utilize the region proposal neural network and the concept embedding neural network to detect the query object, as described below. Because the object selection system can detect objects associated with both known and unknown object classes, the object selection system can detect any query object that a user may request be selected or identified in an image.

In some embodiments, the object selection system can detect objects in connection with a search query. To illustrate, in one or more embodiments, the object selection system can identify a search query that includes a query object. In response to the search query, the object selection system object selection system can detect the query object in one or more digital images using an appropriate detection neural network. Further, the object selection system can provide digital images including the query object in response to the search query.

In alternative embodiments, the object selection system can detect objects in connection with a selection query (e.g., a quest to select a particular object in a digital image). In response to the selection query, the object selection system object selection system can detect one or more instances of the query object a digital image using an appropriate detection neural network. The object selection system can then select the detected instances of the query object. In particular, the object selection system can provide the detected query object (e.g., an approximate boundary including the detected query object) to an object mask neural network. The object mask neural network, in various embodiments, generates an object mask of the detected object.

In one or more embodiments, the object selection system can obtain a query object based on a query string. To illustrate, the object selection system can detect a query string from a user requesting the object selection system to automatically select a given object within an image and/or edit the image with respect to the given object. In some embodiments, the object selection system parses the query string and/or utilizes natural language processing to determine parts of speech, such as nouns. For example, a noun in a query string can correspond to the query object the user is requesting to be automatically selected in an image.

As previously mentioned, the object selection system provides numerous advantages benefits, and practical applications over conventional systems. For example, the object selection system can detect and select objects across a large scope of object classes including unknown object classes. As mentioned above, the object selection system is not limited to a particular well-known object class but can detect many known objects (e.g., foreground objects and concept-based objects) and even unknown objects. In this manner, the object selection system provides flexibility over conventional systems.

As a further example, the object selection system provides increased accuracy over conventional systems. For instance, the object selection system improves object detection accuracy by determining the object detection neural network that best corresponds to a query object from a group of different object detection neural networks. Indeed, by utilizing an object detection neural network that is tailored to the query object, the object selection system achieves improved accuracy in object detection as well as object selection.

Furthermore, the object selection system provides improved efficiency over conventional systems by utilizing an object selection pipeline in various embodiments. Indeed, unlike closed end-to-end conventional systems, when a fault occurs, the object selection system can pinpoint the faulty component in the object selection pipeline and repair the component. For example, the object selection system can replace and/or upgrade components within the object selection pipeline with more efficient versions.

Additionally, the object selection system significantly reduces the number of actions that many conventional systems require of users to select an object within an image. Rather than the user using inefficient mouse input-based tools to manually select an object, the user "tells" (e.g., provides verbal cues in a query string) the object selection system which object to select and the object selection system automatically detects and selects the object. Indeed, the object selection system greatly simplifies the object selection process to one or two simple actions by the user.

Additional advantages and benefits of the object selection system will become apparent in view of the following description. Further, as illustrated by the foregoing discussion, the present disclosure utilizes a variety of terms to describe features and advantages of the object selection system. Before describing the object selection system with reference to figures below, additional detail is now provided regarding the meaning of such terms.

As used herein, the term "digital image" (or simply "image") refers to a digital graphics file that when rendered displays one or more objects. In particular, an image can include one or more objects associated with any suitable object type or object class. In various embodiments, an image editing system displays an image on a computing device, such as a client device. In additional embodiments, the image editing system enables a user to modify or change an image as well as generate new images. For example, the image editing system enables a user to copy an object selected in a first image over the background of a second image.

The term "object," as used herein, refers to a visual representation of a subject, concept, or sub-concept in an image. In particular, an object refers to a set of pixels in an image that combine to form a visual depiction of an item, article, partial item, component, or element. An object can correspond to a wide range of classes and concepts. For example, objects include specialty objects, conceptual objects, objects from known-classes, and unknown object classes (e.g., objects not used in training any of the object detection neural networks). In some embodiments, an object includes multiple instances of the object. For example, an image of a rose bush includes multiple instances of roses. In one or more embodiments, an object includes sub-objects, parts, or portions. For example, a person's face or leg can be objects that are part of another object (e.g., the person's body). As another example, a shirt is an object that can be part of another object (e.g., a person).

As mentioned above, the object selection system can accurately detect and automatically select an object within an image based on a query string. As used herein, the term "query string" refers to a text string of one or more words that indicates a target object. A query string can include a noun representing a query object. In general, the object selection system receives a query string when a user requests the object selection system to automatically select an object in an image. In some embodiments, the query string is submitted as a text string. In alternative embodiments, the object selection system detects alternative user input, such as voice data, and converts the alternative user input into text to obtain the query string.

As used herein, the term "object mask" or "segmentation mask" or "object segmentation" refers to an indication of a plurality of pixels portraying an object. For example, an object mask can include a segmentation boundary (e.g., a boundary line or curve indicating an edge of one or more objects) or a segmentation mask (e.g., a binary mask identifying pixels corresponding to an object). Generating an object mask is sometimes referred to as "selecting" a target object (i.e., identifying pixels that represent the target object).

As used herein, the term "approximate boundary" refers to an indication of an area including an object that is larger and/or less accurate than an object mask. In one or more embodiments, an approximate boundary can include at least a portion of a query object and portions of the image not comprising the query object. An approximate boundary can include any shape, such as a square, rectangle, circle, oval, or other outline surrounding an object. In one or more embodiments, an approximate boundary comprises a bounding box.

Moreover, an approximate boundary can also encompass potential objects. As used herein, the term "potential object" refers to the area or portion of an image that potentially includes an object or at least a portion of an object (e.g., a sub-object or object part). In one or more embodiments, the object selection system utilizes a region proposal neural network to detect regions or areas of an image that include potential objects. Further, the object selection system can indicate the detected potential object by capturing the area of the image within an approximate boundary. In some embodiments, one or more potions of a potential object go beyond the approximate boundary, as described above.

As used herein, the term "query object" refers to an object that is being requested by the user (or other entity) for detection and selection. For example, a noun in a query string can indicate the query object. Also, the term "query string" refers to a text string of one or more words that indicates an object. In general, the object selection system receives a query string when a user requests the object selection system to automatically select an object in an image. In some embodiments, the query string is submitted as a text string. In alternative embodiments, the object selection system detects alternative user input, such as voice data, and converts the alternative user input into text to obtain the query string.

The term "object selection pipeline" refers to a collection of components and actions utilized to detect and select a query object in an image. In various embodiments, the object selection system utilizes a subset of the components and actions in the object selection pipeline to detect and select a query object in an image, where output from one component is provided as input to another component. The components and actions can include neural networks, machine-learning models, heuristic models, and/or functions. Further, the components and actions in the object selection pipeline can be interchangeable, removable, replaceable, or upgradable, as described in further detail below.

As mentioned above, the object selection system can employ machine learning and various neural networks in various embodiments. The term "machine learning," as used herein, refers to the process of constructing and implementing algorithms that can learn from and make predictions on data. In general, machine learning may operate by building models from example inputs, such as image exposure training pairs within a training dataset of images, to make data-driven predictions or decisions. Machine learning can include neural networks (e.g., a natural language processing neural network, a known object class detection neural network, a region proposal neural network, an object classification neural network, an unknown object class detection neural network, a region proposal neural network, a concept embedding neural network, an object mask neural network, and/or a selected attribute detection neural network), data-based models (e.g., a natural language processing model, an object recognition model, an object classification model, a known object class detection model, an unknown object class detection model, a filtering model, a concept embedding model, an object classification model, a region proposal model, and/or a selection object attribute model), or a combination of networks and models.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), Region-CNN (R-CNN), Faster R-CNN, Mask R-CNN, and single shot detect (SSD).

Referring now to the figures, FIG. 1 illustrates a schematic diagram of a system 100 for detecting objects. A shown, the system 100 can include the object selection system 106. As shown in FIG. 1, the system 100 includes a client device 102 and a server device(s) 110 connected via a network 108. Additional detail regarding computing devices (e.g., the client device 102 and the server device(s) 110) is provided below in connection with FIG. 12. In addition, FIG. 12 also provides additional detail regarding networks, such as the illustrated network 108.

Although FIG. 1 illustrates a particular number, type, and arrangement of components within the system 100, various additional environment configurations are possible. For example, the system 100 can include any number of client devices. As another example, the server device(s) 110 can represent a set of connected server devices. As a further example, the client device 102 may communicate directly with the server device(s) 110, bypassing the network 108 or utilizing a separate and/or additional network.

As shown, the system 100 includes the client device 102. In various embodiments, the client device 102 is associated with a user (e.g., a user client device), such as the user that requests automatic selection of an object in an image. The client device 102 can include an image editing system 104 and an object selection system 106. In various embodiments, the image editing system 104 implements the object selection system 106. In alternative embodiments, the object selection system 106 is separate from the image editing system 104. While the image editing system 104 and the object selection system 106 is shown on the client device 102, in some embodiments, the image editing system 104 and the object selection system 106 are located remotely from the client device 102 (e.g., on the server device(s) 110), as further explained below.

The image editing system 104, in general, facilitates the creation, modification, sharing, and/or deletion of digital images within applications. For instance, the image editing system 104 provides a variety of tools related to image creation and editing (e.g., photo-editing). For example, the image editing system 104 provides selection tools, color correction tools, and image manipulation tools. Moreover, the image editing system 104 can operate in connection with one or more applications to generate or modify images. For example, in one or more embodiments, the image editing system 104 operates in connection with digital design applications such as ADOBE® PHOTOSHOP®, ADOBE® ELEMENTS®, ADOBE® INDESIGN®, or other image editing applications.

In some embodiments, the image editing system 104 provides an intelligent image editing assistant that performs one or more automatic image editing operations for the user. For example, given an image of three men, a user requests that the image editing system "remove the telephone pole." As part of fulfilling the request, the image editing system 104 utilizes the object selection system 106 to automatically select the telephone pole. The image editing system 104 can then utilize additional system components (e.g., a hole filling neural network) to remove and replace the selected telephone pole (e.g., the detected query object).

As mentioned above, the image editing system 104 includes the object selection system 106. As described in detail below, the object selection system 106 can accurately detect and automatically select a query object in an image based on a user's request (e.g., a user-provided query string). The object selection system 106, in many embodiments, can utilize an object selection pipeline to determine which object detection neural networks to utilized based on the query object as well as which additional neural networks and/or models to utilize to select the particular requested query object.

As shown, the system 100 also includes the server device(s) 110. The server device(s) 110 includes an object selection server system 112. For example, in one or more embodiments, the object selection server system 112 represents and/or provides similar functionality as described herein in connection with the object selection system. In some embodiments, the object selection server system 112 supports the object selection system 106 on the client device 102.

Indeed, in one or more embodiments, the server device(s) 110 can include all, or a portion of, the object selection system 106. In particular, the object selection system 106 on the client device 102 can download an application from the server device(s) 110 (e.g., an image editing application from the object selection server system 112) or a portion of a software application.

In some embodiments, the object selection server system 112 can include a web hosting application that allows the client device 102 to interact with content and services hosted on the server device(s) 110. To illustrate, in one or more embodiments, the client device 102 accesses a web page supported by the server device(s) 110 that automatically selects objects in images based on the user indicating a query object via the client device 102. As another example, the client device 102 provides an image editing application that provides the image and the query object to the object selection server system 112 on the server device(s) 110, which then detects the query object and provides an object mask of the detected query object back to the client device 102. Then, utilizing the object mask, the image editing application on the client device 102 selects the detected query object.

Figure 2:
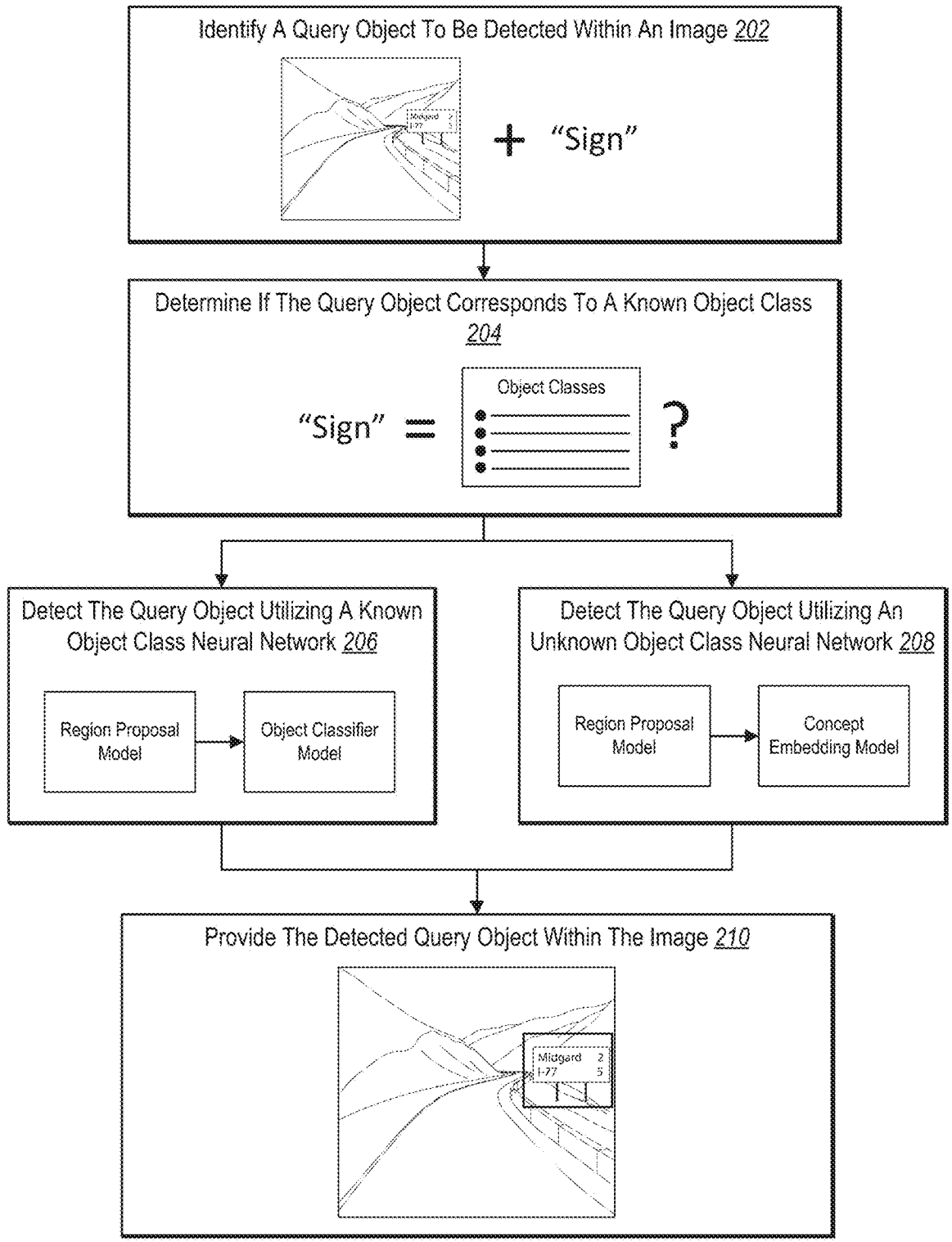
FIG. 2 illustrates a schematic diagram of automatically detecting and selecting a query object in an image in accordance with one or more embodiments.

Turning to FIG. 2, an overview of utilizing the object selection system to automatically select an object in an image is shown. In particular, FIG. 2 illustrates a series of acts 200 of automatically detecting and selecting a query object in an image in accordance with one or more embodiments. In various embodiments, the object selection system 106 performs the series of acts 200.

As shown in FIG. 2, the object selection system 106 performs an act 202 of identifying a query object to be detected within an image. For example, a user utilizes an image editing program to edit an image. While editing the image, the user desires to select a particular object within the image. Accordingly, the object selection system 106 can provide the user with a graphical interface that enables the user to enter a query object (e.g., via a query string) for automatic selection. As shown in FIG. 2 in connection with the act 202, the user provides the query string of "sign" to be selected from the image of a mountain pass.

In addition, the object selection system 106 performs the act 204 of determining if the query object corresponds to a known object class. For example, the object selection system 106 can compare the query object to a list of object classes to determine if the query object matches or is similar to a known object class. In some embodiments, the list of object classes is based on object classes used to train a known object class neural network.

If the object selection system 106 determines that the query object corresponds to a known object class, the object selection system 106 performs the act 206 of detecting the query object utilizing a known object class neural network. Indeed, based on determining that the query object of "sign" corresponds to a known object class, the object selection system 106 selects the known object class detection neural network. As shown, in some embodiments, the known object class neural network can include a region proposal model and an object classification model.

Alternatively, if the object selection system 106 determines that the query object does not correspond to a known object class, the object selection system 106 performs the act 208 of detecting the query object utilizing an unknown object class neural network. For example, as shown, the object selection system 106 can utilize a region proposal model and a concept embedding model as part of the unknown object class neural network to detect the query object associated with an unknown object class.

As illustrated in FIG. 2, the object selection system 106 performs the act 210 of providing the detected query object within the image. For example, the object selection system 106 can provide the detected query object as a selected object within the image. In some embodiments, the object selection system 106 can provide the selected query object within an image editing application on a client device associated with the user.

In additional embodiments, upon detecting the query object, the object selection system 106 can generate an object mask for the detected query object. For example, the object selection system 106 can provide the detected object to an object mask neural network, which generates an object mask (e.g., selection mask) for the object.

As a note, the object selection system 106 can perform some of the acts 202-210 in the series of acts 200 in a variety of orders. For example, the object selection system 106 can detect potential query object in the image before determining whether the query object corresponds to a known object class. In some embodiments, the order utilized by the object selection system 106 is based on the object type or class of the query object.

Figure 3:
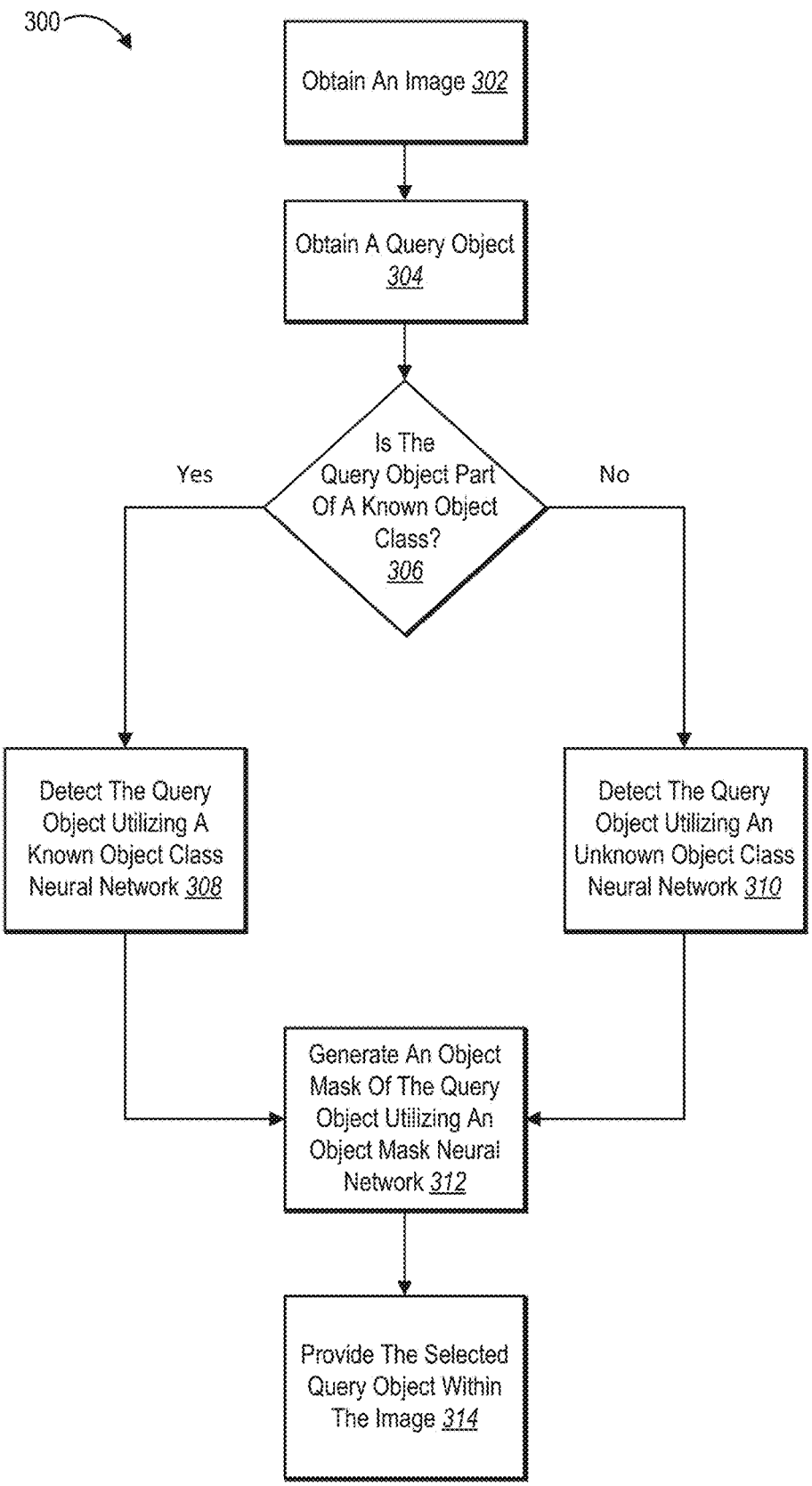
FIG. 3 illustrates a state diagram of utilizing an object selection pipeline to detect and select a query object in accordance with one or more embodiments.

Turning now to FIGS. 3-9, additional detail is provided regarding the object selection system 106 generating and utilizing an object selection pipeline to automatically select and accurately detect objects requested by an object detection request. In particular, FIG. 3 illustrates an example embodiment of an object selection pipeline. FIGS. 5-9 illustrate expanded portions of the object selection pipeline along with example corresponding graphical user interfaces.

As mentioned, FIG. 3 illustrates a schematic diagram of utilizing an object selection pipeline 300 to detect select a query object in accordance with one or more embodiments. In various embodiments, the object selection system 106 performs actions included in the object selection pipeline 300. In alternative embodiments, an image editing system and/or image editing application can perform one or more of the included actions described in connection with FIG. 3.

As shown, the object selection pipeline 300 includes an act 302 of the object selection system 106 obtaining an image (i.e., a digital image). For example, the object selection system 106 can detect the user selecting an image to be loaded into an image editing application, as previously described. In alternative embodiments, the image can be one of a plurality of images (e.g., a collection of images in a database) that the object selection system 106 will analyze to find an object. In general, the image includes one or more objects. For instance, the image can include objects of various types and classes.

In addition, the object selection pipeline includes an act 304 of the object selection system 106 obtaining a query object. For example, the object selection system 106 can provide an object selection interface (e.g., shown in FIG. 6A) where a user can enter one or more words indicating the query object that they would like the object selection system to automatically select. As mentioned above, in some embodiments, the object selection system 106 can provide alternative forms of user input, such as audio input telling the object selection system 106 to select an object in the image.

In some embodiments, the act 304 of obtaining a query object can include the object selection pipeline 300 analyzing a query string to identify the query object. For example, the object selection system 106 can detect the object selection system 106 providing a query string that includes the query object. Then, by parsing the query string and utilize natural language processing, the object selection system 106 can identify the query object. Additional detail regarding the act 304 is provided with respect to FIG. 9 below.

Upon detecting the query object, the object selection system 106 determines whether the query object is part of a known object class, as shown in the act 306. For example, in various embodiments, the object selection system 106 can utilize an object detection neural network trained to detect objects belonging to a number of known object classes. In alternative embodiments, the object selection system 106 can utilize another type of machine-learning object detection model. Accordingly, the object selection system 106 can compare the object class of the query object to the known object classes to determine if the query object is part of the known object classes. If so, the object selection system 106 can proceed to the act 308 of the object selection pipeline 300. Otherwise, the object selection system 106 can proceed to the act 310 of the object selection pipeline 300, described further below.

As just mentioned, the object selection pipeline 300 includes the act 308 of the object selection system 106 detecting the query object utilizing a known object class network. Known object classes can include object classes tagged in training images and used to train an object detection neural network. In alternative embodiments, the object selection system 106 can utilize another type of machine-learning known object class detection model. Accordingly, based on detecting that the query object is associated with a known object class, the object selection system 106 can utilize a known object class detection neural network to optimally detect the query object. Additional detail regarding the act 308 is provided below with respect to FIGS. 4-6D.

If the object selection system 106 is unable to determine an object class corresponding to the query object, the object selection system 106 can further extend its object recognition capabilities by detecting objects of unknown categories. Indeed, in some embodiments, while the list of known object classes can often number in the hundreds or thousands, the object selection system 106 can detect a much larger number of objects by identifying query objects corresponding to unknown object classes.

To illustrate, if the object selection system 106 determines in the act 306 that the query object is not part of a known object class, the object selection system 106 can detect the query object using an unknown object class detection network to detect the query object, as shown in act 310. As mentioned above, in various embodiments, the unknown object class detection network can include a region proposal model to detect potential objects (i.e., candidate objects) in the image. In alternative embodiments, the object selection system 106 can utilize another type of machine-learning unknown object class detection model. In addition, the object selection system 106 can utilize the concept embedding model to filter down the potential objects and detect the query object. Additional detail regarding the act 306 is provided with respect to FIGS. 7-8D below.

Upon detecting the query object, either using the known object class detection network (e.g., the act 308) or the unknown object class detection network (e.g., the act 310), the object selection system 106 can provide the detected object to an object mask neural network. As shown, the object selection pipeline 300 includes the act 312 of the object selection system 106 generating an object mask of the query object utilizing an object mask model. In various embodiments, the object selection system 106 can provide a bounding box to an object mask model, which generates a mask for the detected query object.

In generating an object mask for a detected query object, the object mask neural model can segment the pixels in the detected query object from the other pixels in the image. For example, the object mask model can create a separate image layer that sets the pixels corresponding to the detected query object to positive (e.g., binary 1) while setting the remaining pixels in the image to a neutral or negative (e.g., binary 0). When this object mask layer is combined with the image, only the pixels of the detected query object are visible. Indeed, the generated object mask can provide a segmentation that enables selection of the detected query object within the image.

The object mask model can correspond to one or more deep neural networks or models that select an object based on bounding box parameters corresponding to the object within an image. For example, in one or more embodiments, the object mask model is an object mask neural network that utilizes the techniques and approaches found in Ning Xu et al., "Deep GrabCut for Object Selection," published Jul. 14, 2017, the entirety of which is incorporated herein by reference. For example, the object mask neural network can utilize a deep grad cut approach rather than saliency mask transfer. As another example, the object mask neural network can utilize the techniques and approaches found in U.S. Patent Application Publication No. 2019/0130229, "Deep Salient Content Neural Networks for Efficient Digital Object Segmentation," filed on Oct. 31, 2017; P7753; and U.S. Pat. No. 10,192,129, "Utilizing Interactive Deep Learning To Select Objects In Digital Visual Media," filed Nov. 18, 2015, each of which are incorporated herein by reference in their entirety.

In alternative embodiments, the object mask model utilizes non-neural networks and/or non-machine-learning techniques to generate an object mask. For example, color classification system 106 receives an outline of an object via user input. In another example, the color classification system 106 creates a rough box near the boundary of the object to generate the object mask.

As shown in FIG. 3, the object selection pipeline 300 includes the act 314 of the object selection system 106 providing the detected query object within the image to the user. For instance, the object selection system 106 can provide the selected query object to the client device associated with the user. For example, the object selection system 106 can automatically select the query object within the image (e.g., using the object mask) for the user within the image editing application mentioned above.

In various embodiments, many of the components are interchangeable with updated versions as well as new components. Accordingly, when faults occur, the object selection system 106 can identify and update the source of the fault. In addition, the object selection system 106 can also add further components to the object selection pipeline to improve the performance of the detected objects in images.

More particularly, upon detecting the location of the fault, the object selection system 106 can upgrade or replace the faulty component. For example, the object selection system 106 can replace the faulty component with an improved version. Similarly, the object selection system 106 can substitute older components with new components with newer versions as the newer versions become available. Further, the object selection system 106 can upgrade and/or replace components without needing to change, retrain, reconfigure, and/or modify other components of the object selection pipeline. Additionally, the object selection system 106 can continue to utilize the object selection pipeline until another fault is detected.

Figure 4:
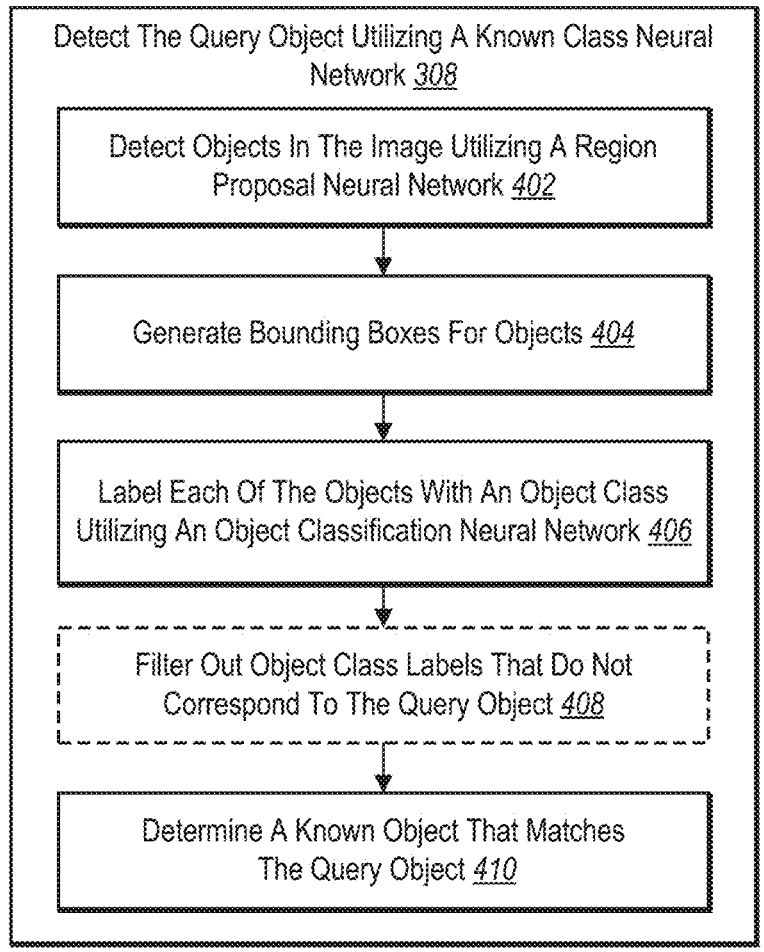
FIG. 4 illustrates a flow chart of detecting a query object utilizing a known object class detection network in accordance with one or more embodiments.

Turning to FIG. 4, a flow chart of detecting a query object utilizing a known object class detection network is illustrated in accordance with one or more embodiments. As described above, FIG. 4 corresponds to the act 308 of the object selection system 106 detecting the query object utilizing a known object class network. In particular, FIG. 4 includes various acts 402-410 that provide additional detail regarding the act 308 of the object selection pipeline 300.

As described above, the object selection system 106 arrives at the act 308 of utilizing a known object class detection neural network based on determining that the query object corresponds to a known object class. In some embodiments, the object selection system 106 can detect that the query object corresponds to a known object type, such as a foreground object or a concept-based object. For example, the object selection system 106 can detect that the query object is associated with an object class or object type used to train a known object class detection neural network.

As shown, the act 308 includes the act 402 of the object selection system 106 detecting objects in the image utilizing a region proposal neural network. In various embodiments, the region proposal neural network is part of the known object class detection neural network or model. For instance, the region proposal neural network forms one or more layers of the known object class detection neural network. In alternative embodiments, the region proposal neural network is separate from the known object class detection neural network. For example, the region proposal neural network is separate from the known object class detection neural network.

In addition, in various embodiments, the object selection system 106 can utilize the region proposal neural network to generate bounding boxes for each of the objects or proposed objects in the image, as shown in the act 404. For example, the region proposal neural network can create an approximate boundary around each proposed object. In some embodiments, the region proposal neural network processes mini sections of the image (e.g., patch image or a cropped image portion) to identify smaller objects within the image that could not be detected with whole image object detection methods. Accordingly, the region proposal neural network can generate multiple bounding boxes that each indicate an object in the image that could potentially be the query object (e.g., a candidate object).

In various embodiments, the known object class detecting neural network reduces the number of bounding boxes utilizing boundary suppression. For example, the known object class detecting neural network can apply one or more criteria or heuristics to suppress large redundant boundary boxes that include multiple smaller boxes. For instance, the known object class detecting neural network and/or the object selection system 106 can utilize intersection over union (IoU) scores to perform the bounding box suppression. As an example of boundary suppression, the known object class detecting neural network can suppress (e.g., remove) a large box around two smaller bounding boxes as the large bounding box is redundant. In some embodiments, this reduction process avoids the object selection system 106 from generating overlapping object masks.

Further, as shown in the act 406, the object selection system 106 labels each of the objects with an object class utilizing an object classification neural network. For instance, the object selection system 106 can utilize the object classification neural network to tag each bounding box with a prediction of one or more known objects identified within the bounding box. In some embodiments, the label includes known object detection confidence scores (e.g., prediction probability scores) for each of the object class tags. In some embodiments, the known object class detecting neural network can generate a list of detected known objects and their corresponding labels to indicate what objects have been detected in the image.

Generally, the object selection system 106 can train the object classification neural network to detect and label objects of known object classes. For example, in various embodiments, the object selection system 106 trains the object classification neural network to recognize hundreds of object classes (e.g., hundreds or thousands of classes). Indeed, the object selection system 106 can train the object classification neural network to analyze an image (e.g., an image patch within the image indicated by a bounding box) and determine one or more known objects (e.g., proposed query objects) included in the image. In some embodiments, the object classification neural network is a CNN (e.g., a R-CNN or a Faster R-CNN). Additional detail regarding training and utilizing the object classification neural network is provided below with respect to FIGS. 5A-5B.

As shown in FIG. 4, the act 308 can include the optional act 408 of the object selection system 106 filtering out object class labels that do not correspond to the query object. For example, in one or more embodiments, the object selection system 106 can eliminate any of the bounding boxes that have one or more labels with known object classes that do not match the query object.

Additionally, or in the alternative, the object selection system 106 can determine a known object that matches the query object, as shown in the act 410. In particular, the object selection system 106 can match the labels for each of the detected known objects (pre- or post-filtering) to identify which detected known object matches the query object. In some embodiments, the object selection system 106 determines that multiple known detected objects match the query object. In other words, the image includes multiple instances of the query object, as described above.

The known object class detection neural network can correspond to one or more deep neural networks or models that detect objects of known object classes. For example, the known object class detection neural network (including the region proposal neural network) can utilize the techniques and approaches found in U.S. patent application Ser. No. 16/388,115, "Robust Training of Large-Scale Object Detectors with Noisy Data," filed on Apr. 8, 2019, which is incorporated herein by reference in its entirety. Alternatively, the known object class detection neural network (including the region proposal neural network) can utilize the techniques and approaches found in S. Ren, K. He, R. Girshick, and J. Sun, *Faster r-cnn: Towards real-time object detection with region proposal networks*, NIPS, 2015, the entire contents of which are hereby incorporated by reference. Further, the object selection system 106 can additionally or alternatively utilize other object detection models or techniques for detecting objects of known classes.

Figure 5A:
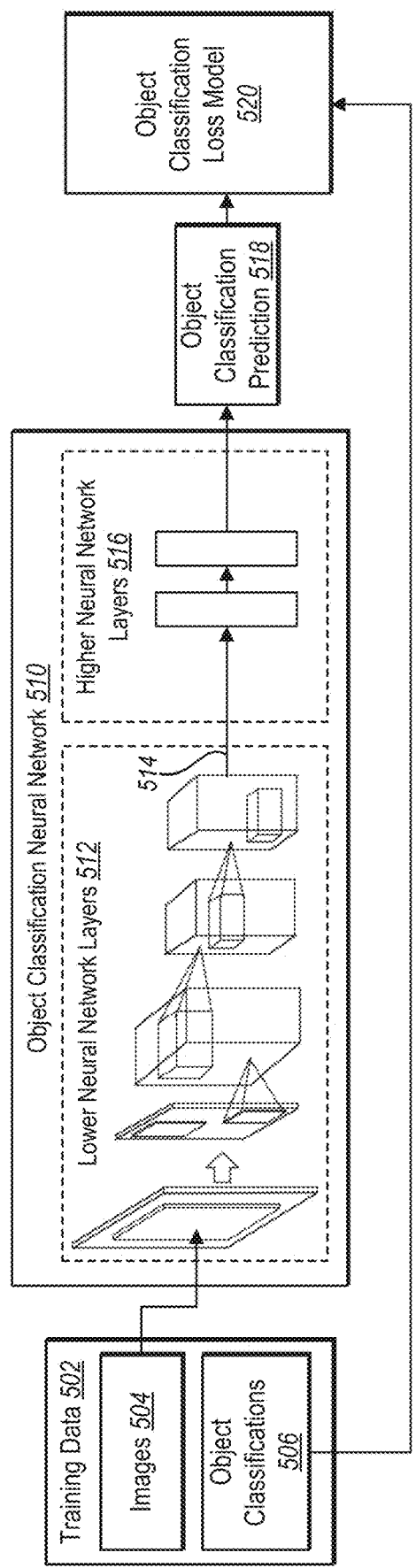
FIGS. 5A-5B illustrate a schematic diagram of training and utilizing an object classification neural network in accordance with one or more embodiments.
Figure 5B:
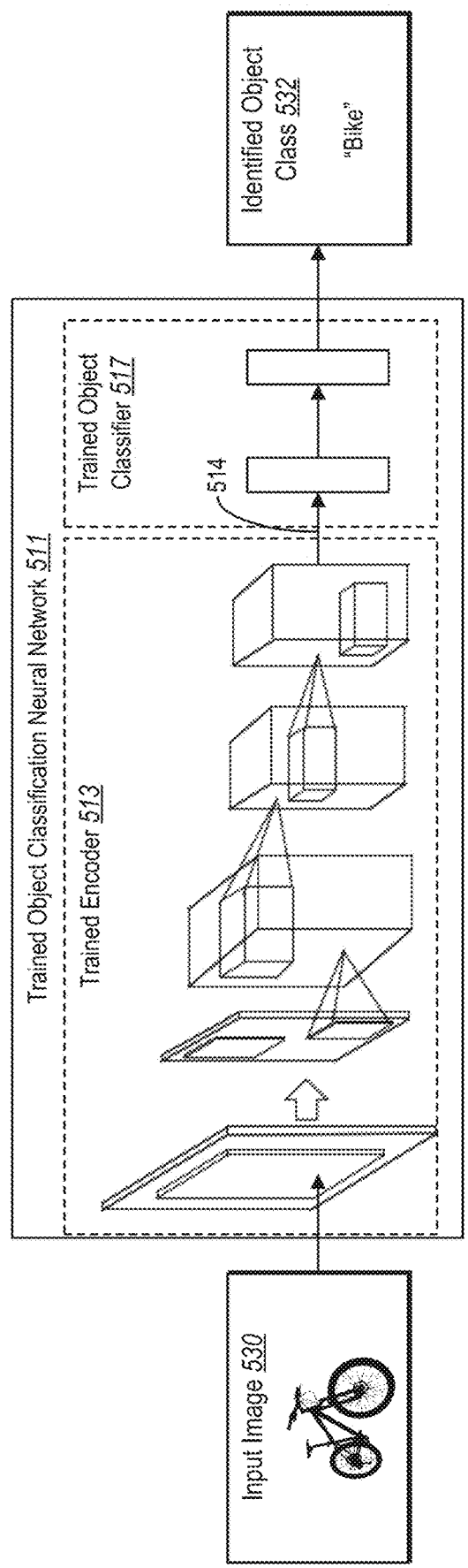

As mentioned above, FIGS. 5A-5B illustrate example diagrams of training an example object classification neural network. In particular, FIG. 5A illustrates training an object classification neural network 510 using training data 502. FIG. 5B illustrates the object selection system 106 utilizing the trained object classification neural network according to one or more embodiments.

In various embodiments, the object selection system 106 obtains a set of objects corresponding to various object classes from one or more sources. For example, the object selection system 106 obtains objects from one or more object repositories (e.g., a local or third-party source). As part of obtaining objects, the object selection system 106 can also obtain object classifications corresponding to the objects. In some instances, the object classifications are provided by user input, such as by an object curator. In other instances, the object classifications are automatically generated.

In various embodiments, the object selection system 106 randomly introduces deviations into the object images 504. For example, the object selection system 106 randomly introduces noise (e.g., small Gaussian noise), blur (e.g., random Gaussian blur), perspective rotation (e.g., a randomly-parameterized affine transformation), and/or shading (e.g., random gradients that fill the input image) into some of the object images 504. These deviations add robustness while training each object neural network as well as enable the a trained object classification neural network 510 to better classify query objects in images.

In one or more embodiments, the object classification neural network 510 is a convolutional neural network (CNN). In some embodiments, the object classification neural network 510 is a deep learning convolutional neural network. In alternative embodiments, the object tag recognition neural network 510 is a different type of neural network.

In various embodiments, the object selection system 106 trains the object classification neural network 510 to classify (e.g., identify or predict) the classification (e.g., name or category) of an image of a query object. Indeed, the object classification neural network 510 can be designed as a single-label learning task network to predict a single object classification (e.g., each object only has one object name).

As shown, the object classification neural network 510 includes lower neural network layers 512 and higher neural network layers 516. In general, the lower neural network layers 512 collectively form an encoder and the higher neural network layers 516 collectively form a decoder or object classifier. In one or more embodiments, the lower neural network layers 512 are convolutional layers that encode object images 504 into hidden encoded features represented as object classification feature vectors 514.

As just mentioned, the lower neural network layers 512 can generate object classification feature vectors 514. Each dimension in an object classification vector provides hidden or latent representations of features of the image 504 being processed by the object classification neural network 510.

The higher neural network layers 516 can comprise fully-connected layers that classify the object classification feature vectors 514 and output object classification probabilities 518 (e.g., an object classification probability vector). In various embodiments, the higher neural network layers 516 include a SoftMax classifier that predicts the object classification best corresponds to each given input object (e.g., an object image). Indeed, the SoftMax classifier outputs an object classification prediction 518 that is n-dimensional and all the entries in the vector sum to one (e.g., to accommodate the single-label learning task). The object selection system 106 selects the entry in the object classification prediction vector with the highest prediction probability as the predicted object classification for the given input object image.

In various embodiments, the object selection system 106 can train the object classification neural network 510 by providing (e.g., feeding) object images 504 from the training data 502 to the object classification neural network 510. The object classification neural network 510 can encode the object images 504 to generate the object classification feature vectors 514. In addition, the object classification neural network 510 can classify the object classification feature vectors 514 (e.g., utilizing a SoftMax object classifier) to generate the object classification probabilities 518.

In addition, during training, the object selection system 106 can provide the object classification prediction 518 to an object classification loss model 520. In various embodiments, the object classification loss model 520 compares the classified object indicated in the object classification prediction 518 to object classifications 506 (e.g., ground truth) corresponding to the object images 504 to determine an amount of object classification error loss (or simply "classification loss"). Indeed, the object selection system 106 can compare the object classification prediction 518 to the object classifications 506 from the training data 502 to determine the accuracy and/or classification loss of the object classification.

Further, the object selection system 106 can utilize the classification loss to train and optimize the neural network layers of the object classification recognition neural network 510 via back propagation and end-to-end learning. Indeed, in various embodiments, the object selection system 106 back propagates the classification loss to tune the object classification feature parameters within layers of the object classification recognition neural network 510. For instance, in one or more embodiments, the object selection system 106 takes the classification loss output from the object classification loss model 520 and provides it back to the lower neural network layers 512 and/or the higher neural network layers 516 using the Adam optimizer. In this manner, the object selection system 106 can iteratively train the object classification neural network 510 to learn a set of best-fit parameters that extract object features from an object image and accurately classify (e.g., predict, identify, and/or label) the object within the image.

Upon training the object classification neural network 510, the object selection system can utilize the trained object classification neural network to retrieve object classes for input images. To illustrate, FIG. 5B shows a diagram of identifying object classes of images utilizing a trained object classification neural network 511 in accordance with one or more embodiments.

As shown, FIG. 5B the object selection system 106 provides an input image 530 showing a bike to the trained object classification neural network 511. In various embodiments, the input image 530 is a patch image of the digital image described above (e.g., the bike is a cropped portion from a larger image provided to a user). More particularly, the region proposal neural network identifies one or more patch images (e.g., indicated by bounding boxes) that each include an object, which the object selection system 106 provides to the trained object classification neural network 511.

In response to receiving the input image 530, the object selection system 106 can determine one or more feature vectors for the object found within the input image 530. In particular, the object selection system 106 can utilize the trained encoder 513 of the trained object classification neural network 511 to extract the one or more object classification feature vectors 514 based on encoding the input image 530.

Using the object classification feature vectors 514 generated by the trained encoder 513, the object selection system 106 can generate an object classification prediction vector that identifies a correspondence between the input image 530 and each known object class. In various embodiments, the object selection system 106 can utilize a trained object classifier 517 of the trained object classification neural network 511 to generate an object classification prediction vector for the input image 530. For example, if 5,000 object classes were used to train the trained object classification neural network 511, the object selection system 106 would generate a 5,000-dimentional object classification probability vector that indicates the probability that the input image 530 matches each of the 5,000 known object classes.

Further, the object selection system 106 can identify an object class from the object classification prediction vector. For example, the object selection system 106 can identify which object class in the object classification prediction vector generated by the trained object classifier 517 has the highest correspondence (e.g., similarity score) with the input image 530. The object selection system 106 can select this object class as the identified object class 532 corresponding to the input image 530.

Upon determining the identified object class 532, the object selection system 106 can label the input image 530 with the identified object class 532. For example, if the input image 530 corresponds to a bounding box within a large digital image, the object selection system 106 can label the bounding box with the identified object class 532. In addition, the object selection system 106 can utilize the trained object classification neural network 511 to classify each identified object within the digital image. Further, once each of objects detected by the region proposal neural network are labeled utilizing the trained object classification neural network 511, the object selection system 106 can determine which of the labeled objects match the query object, as described above.

In connection with FIGS. 4-5B, FIGS. 6A-6B provide an illustration of a graphical user interface for detecting a query object corresponding to a known object class. In particular, FIGS. 6A-6D illustrate a graphical user interface 602 that illustrates the object selection system 106 utilizing a known object class detection neural network to detect the query object in accordance with one or more embodiments. The client device 600 in FIGS. 6A-6D can represent the client device 102 introduced above with respect to FIG. 1. For instance, the client device 600 includes an image editing application that implements the image editing system 104 having the object selection system 106. For example, the graphical user interface 602 in FIGS. 6A-6D can be generated by the image editing application.

Figure 6A:
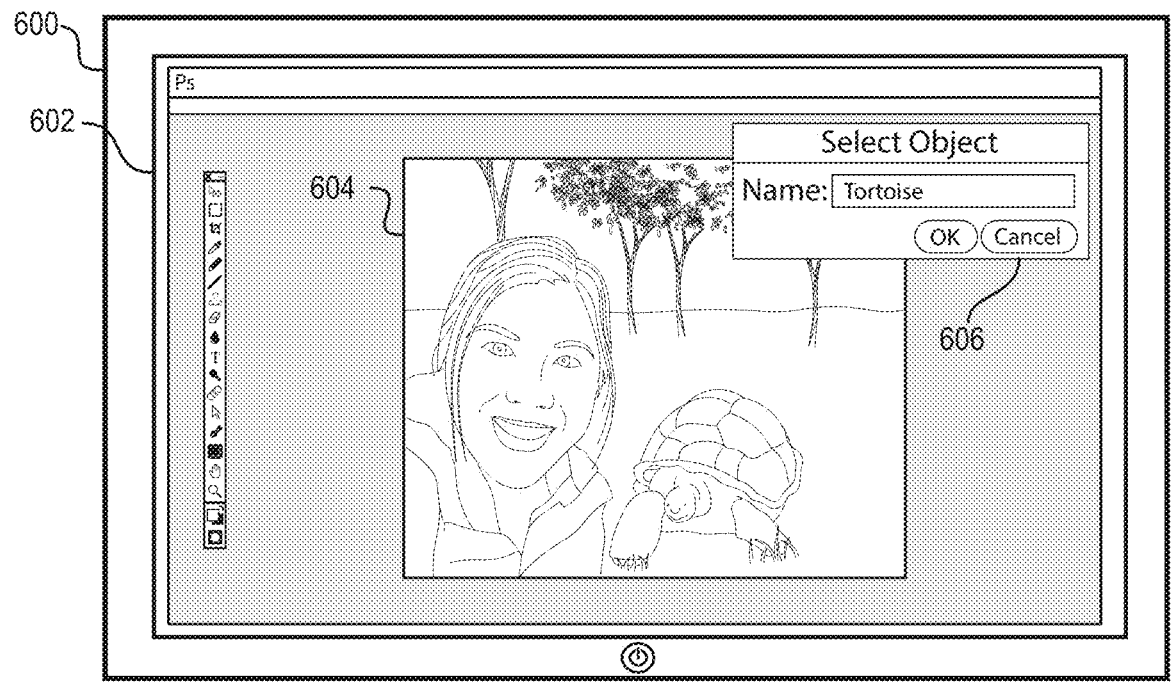
FIGS. 6A-6D illustrate a graphical user interface showing a process of utilizing a known object class detection network to detect the query object in accordance with one or more embodiments.

As shown in FIG. 6A, the graphical user interface 602 includes the image editing application displaying an image 604 (e.g., a woman with a tortoise in front of a row of trees). Additionally, the image editing application includes various tools having image selection and editing options. For example, the image editing application includes an object selection interface 606. As shown, the object selection interface 606 includes selectable options to confirm or cancel an object detection request. In some embodiments, the object selection interface 606 includes additional elements, such as a selectable option to capture audio input from a user dictating the query string.

As shown, the object selection system 106 enables the user to provide a query string within the object selection interface 606. In some embodiments, the object selection system 106 can enable a user to provide the audio or other input to indicate a query string. For example, the client device 600 can include a microphone that captures the user speaking the query string and speech-to-text processing to convert the query string to text.

In one or more embodiments, the object selection system 106 can provide the object selection interface 606 within the image editing application in response to the user selecting a selection tool within the image editing application. As shown, the object selection interface 606 enables a user to request automatic detection of an object within the image 604 e.g., the query object). For example, the object selection system 106 detects a query string provided by the user requesting automatic selection of a query object (i.e., "tortoise") in the image 604.

As explained previously, upon the user providing the query object (e.g., within a query string), the object selection system 106 can utilize the object selection pipeline 300 to determine how to optimally detect the requested object. In this illustrative example, the object selection system 106 can determine that the query object in the query string is the "tortoise." Based on identifying the query object, the object selection system 106 can determine that the query object corresponds to a known object class used in training a known object class detection neural network. Accordingly, the object selection system 106 can select and utilize the known object class detection neural network (e.g., the act 308 of the object selection pipeline 300).

Figure 6B:
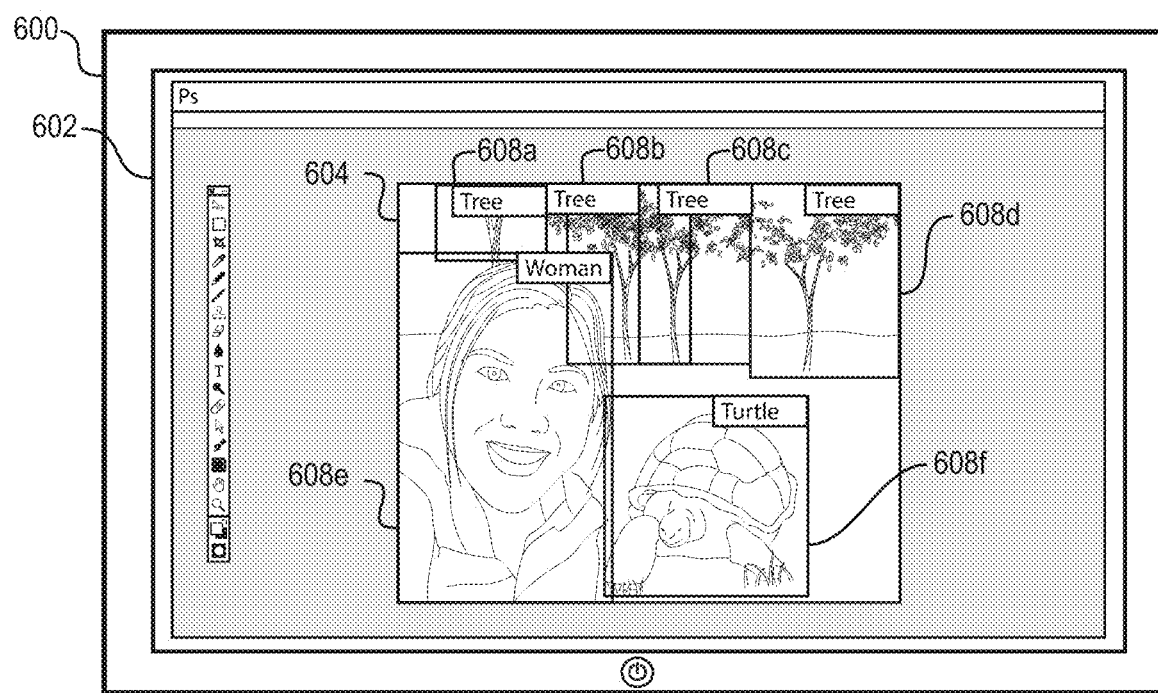

As shown in FIG. 6B, the object selection system 106 can utilize the known object class detection neural network to detect known objects 608a-608f within the image 604. As described above, the known object class detection neural network can detect candidate objects within the image 604, generate bounding boxes around the candidate objects, and tag each of the bounding boxes with object class labels to create the known objects 608a-608f (e.g., labeled detected objects). As shown, the known object class detection neural network can detect the known objects of trees 608a-608d, a woman 608e, and a turtle 608f.

In some embodiments, the known object class detection neural network can tag the known objects 608a-608f with additional data. For example, the known object class detection neural network adds a confidence score indicating how well a known object corresponds to the identified object class. In another example, the known object class detection neural network adds a secondary known object class predictions and/or other identified object classes that are above a threshold correlation value.

As described above, in some embodiments, the known object class detection neural network can filter out detected known objects that do not match the query object. For example, given the query object of "tortoise," the known object class detection neural network can disregard the detected known objects corresponding to the trees 608a-608d and the woman 608e. Additionally, or in the alternative, the known object class detection neural network can identify the detected known object having the same object class as the query object. For instance, the known object class detection neural network determines that the detected turtle 608f matches the object class query object of "tortoise" (e.g., has a correspondence score above a matching threshold number). As shown, FIG. 6C indicates the tortoise as the detected query object 610.

Upon identifying the detected query object 610, the object selection system 106 can select the object for the user. To illustrate, FIG. 6D shows the object selection system 106 automatically selecting the detected known object (i.e., the tortoise). In particular, as described above, the object selection system 106 can provide the detected query object 610 to an object mask neural network and/or generate an object mask of the detected query object 610, resulting in a selected query object 612.

Further, as shown in FIG. 6D, the object selection system 106 can provide the selected query object 612 in response to the selection query (e.g., the query string). Indeed, the object selection system 106 can automatically (e.g., without user input beyond providing the query string) select the tortoise for the user within the image editing application by providing a mask of the tortoise.

Figure 6C:
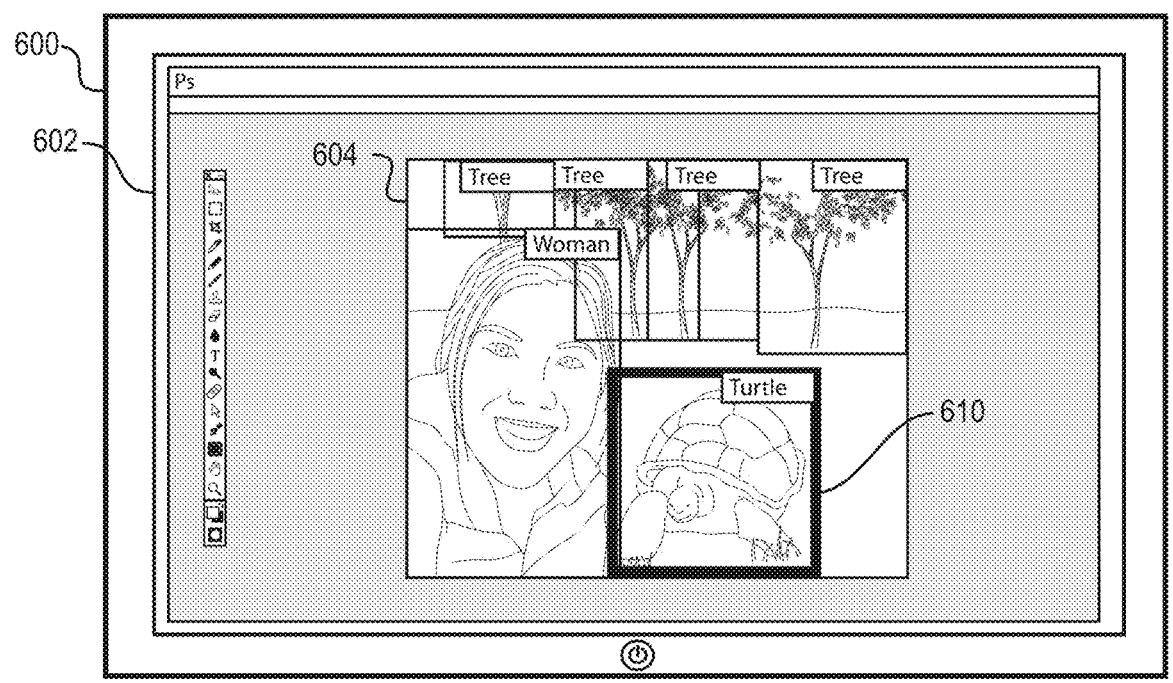
Figure 6D:
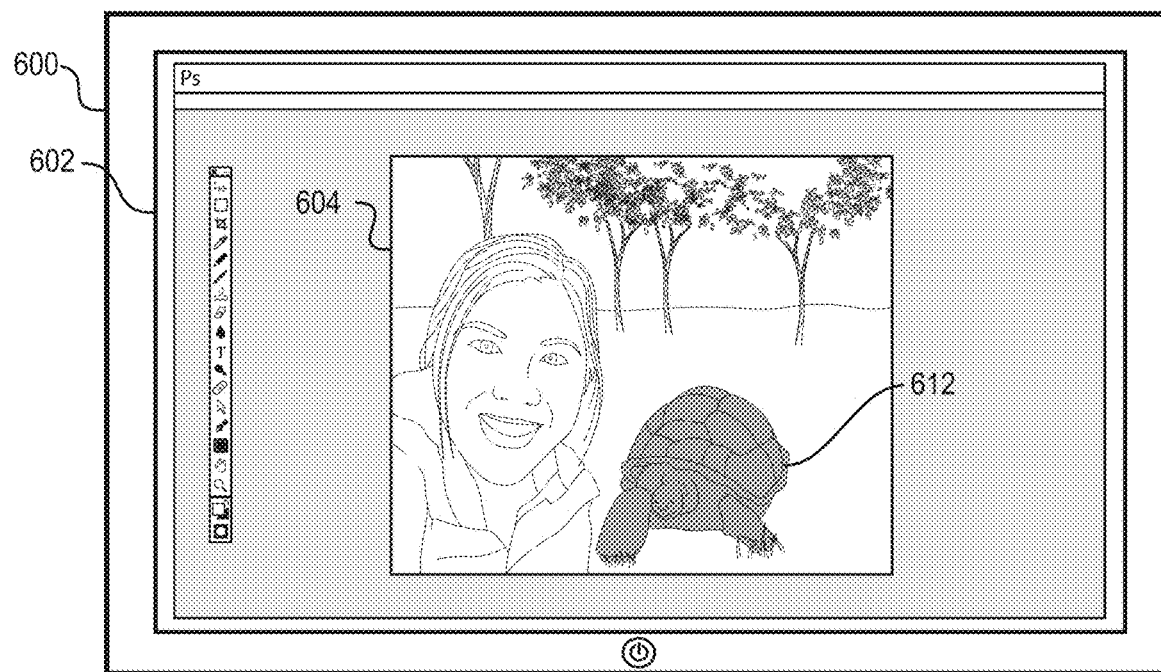

As a note, FIGS. 6B and 6C show the object selection system 106 utilizing the known object class detection neural network detecting the query object. In many embodiments, the object selection system 106 does not display intermediary actions to the user. Rather, the object selection system 106 appears to automatically detect and accurately select the query object in response to the user's query string request. In other words, the graphical user interface 602 jumps from FIG. 6A to FIG. 6D. In alternative embodiments, the object selection system 106 displays one or more of the intermediary actions to the user. For example, the object selection system 106 displays the bounding boxes of each detected object with labels, as shown in FIG. 6C.

FIGS. 4-6D describe various embodiments of detecting a query object in one or more digital images utilizing a known object class detection model. Accordingly, the actions, algorithms, and models described in connection with FIGS. 4-6D provide example structure and architecture for performing a step for detecting the query object in one or more digital images utilizing a known object class detection model.

Figure 7A:
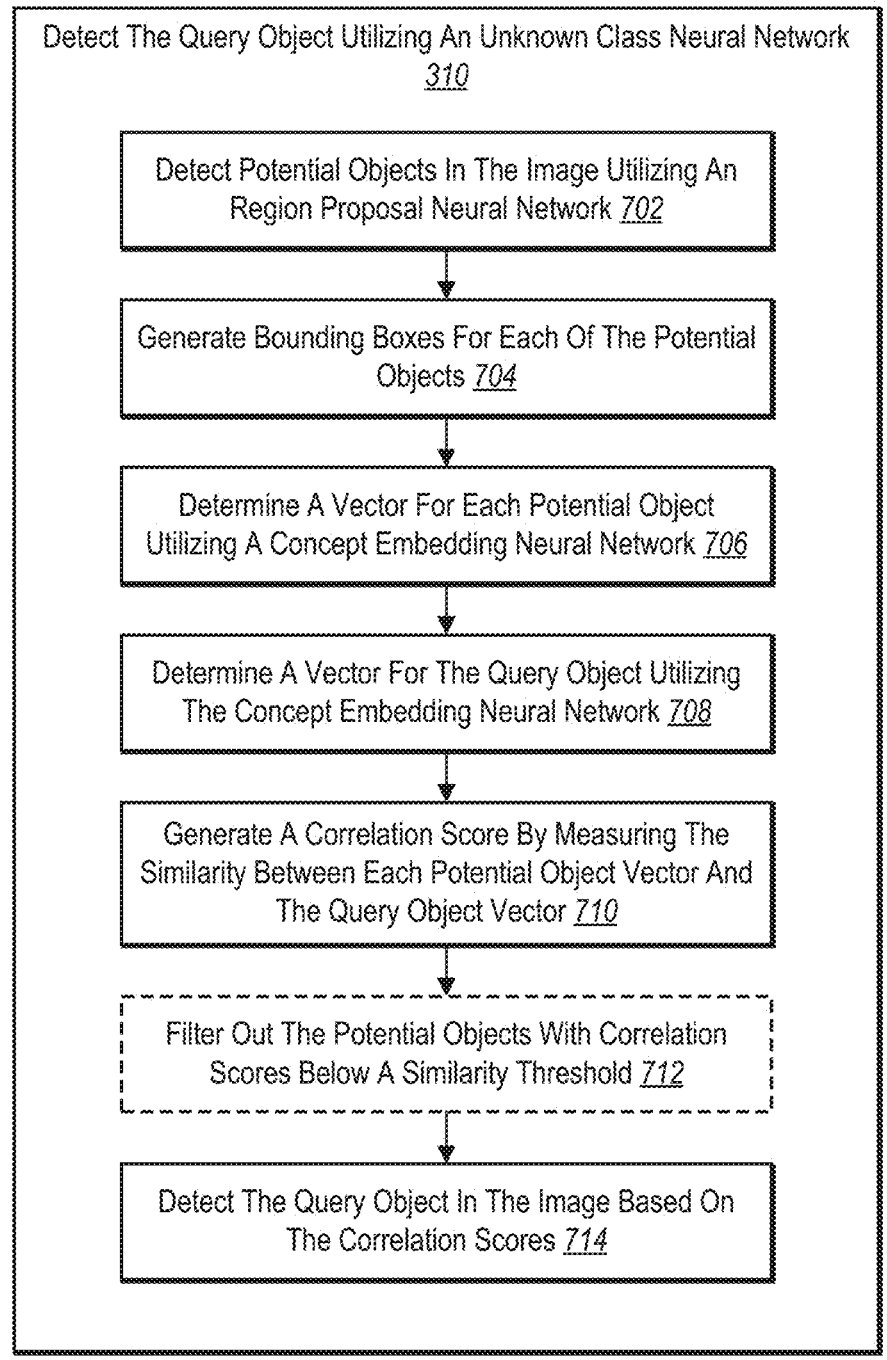
FIG. 7A illustrates a flow chart of detecting a query object corresponding to an unknown object class utilizing multiple networks in accordance with one or more embodiments.

Turning to FIG. 7, a flow chart of detecting a query object corresponding to an unknown object class utilizing multiple networks is illustrated in accordance with one or more embodiments. As mentioned above, FIG. 7 corresponds to the act 310 of detecting the query object utilizing an unknown object class network within the object selection pipeline 300 described above in connection with FIG. 3. In particular, FIG. 7 includes various acts 702-714 that provide additional detail regarding the act 310.

As shown, the act 310 of detecting the query object utilizing an unknown object class network can further include the act 702 of the object selection system 106 detecting potential objects in the image utilizing a region proposal neural network. In one or more embodiments, the region proposal neural network corresponds to the region proposal neural network described above in connection with FIG. 4 and act 402. For example, in some instances, the region proposal neural network forms the first part of the known object class detection neural network. In other instances, the region proposal neural network is a standalone neural network utilized to identify potential objects for use with both known and unknown object class neural networks.

As described above in connection with the act 402, the region proposal neural network can identify potential objects. With respect to the act 702, the object selection system 106 can utilize the region proposal neural network to identify potential objects for which no known object class is recognized. For example, the region proposal neural network can utilize similar techniques to identify potential objects within the image, but does not try to predict, identify, or label object classes for the potential objects.

In alternative embodiments, the region proposal neural network is separate from the region proposal neural network described above. For example, the region proposal neural network in the act 702 is a region proposal neural network that identifies sub-regions of the image that encompass potential objects (e.g., patches or patch images). Indeed, the region proposal neural network is trained to identify and indicate portions of the image (i.e., regions) that include a potential object.

Upon detecting potential objects, the region proposal neural network can generate approximate boundaries (e.g., a bounding box) for each of the potential objects, as shown in the act 704. At this point, each unlabeled bounding box includes a potential candidate object that could correspond to the query object. Upon detecting potential objects within the image, the object selection system 106 can determine if any of the potential objects correspond to the query object. To illustrate, the act 310 can further include the act 706 of the object selection system 106 determining a vector for each potential object (e.g., an image embedding). For example, the object selection system 106 can utilize a concept embedding neural network (or another type of machine-learning concept embedding model) to generate an image vector for each portion to the image (e.g., bounding boxes) that includes a potential object.

As also shown, the act 310 can also include the act 708 of determining a vector for the query object (e.g., a topic embedding). In particular, the object selection system 106 can utilize the concept embedding neural network to generate a word vector for the query object from the query string. In one or more embodiments, the concept embedding neural network can generate the image vectors and the word vector in the same vector space.

As mentioned above, the object selection system 106 can train the concept embedding neural network to map images and text that represent the same object, object class, and/or object-based concept to the same location in vector space (e.g., embedded space). To illustrate, in some embodiments, the object selection system 106 can train the concept embedding neural network using training data that includes around 20,000 object classes and corresponding images samples. Through training, the concept embedding neural network can generate a shared embedding vector space as well as learns how to generate embeddings for both potential objects (e.g., images) and query objects (e.g., text) that map to the shared embedding vector space.

For each image of a potential object, the object selection system 106 can determine a correspondence with the query object. To illustrate, the act 310 can further include the act 710 of the object selection system 106 generating a correlation score by measuring the similarity between each potential object vector and the query object vector. In other words, the object selection system 106 can determine which potential object embedding vector is closest to the query object embedding vector in learned vector space. In some embodiments, the object selection system 106 can rank the potential objects based on their distance from the query object in vector space.

Further, the object selection system 106 can generate a correlation score to indicate the similarity between each potential object and the query object. In some embodiments, the correlation score for a potential object is inversely proportional to the vector space distance between the potential object and the query object. Accordingly, the smaller the vector space distance between embeddings, the larger the correlation score. In a number of embodiments, the object selection system 106 generates a correlation score between 0-100 (e.g., an absolute score or percentage) to indicate the similarity between a potential object and the query object.

As shown in FIG. 7, the act 310 can further include the optional act 712 of the object selection system 106 filtering out the potential objects with correlation scores below a similarity threshold. In some embodiments, the object selection system 106 can utilize a similarity threshold to determine which potential objects likely match the query object. For example, potential objects having less than a 75% correlation score with the query object are filtered out and ignored. In some embodiments, the object selection system 106 filters out the bottom x percent of the potential objects (e.g., disregards the bottom 90%) from consideration as the query object. In many instances, by filtering out potential objects having low confidence scores, the object selection system 106 can achieve object detection results similar to the known object class detection neural network described above.

Next, the object selection system 106 can detect the query object from the potential objects. For example, as shown in FIG. 7, the act 310 further includes the act 714 of the object selection system 106 detecting the query object in the image based on the correlation scores. In one or more embodiments, the object selection system 106 can select the potential object that has the highest correlation score as the detected query object. In some embodiments, the object selection system 106 selects the top number or percentage of potential objects as instances of the detected query object. In other embodiments, the object selection system 106 determines that each potential object remaining after filtering (e.g., the act 712) is an instance of the detected query object, particularly if the similarity threshold is high (e.g., above 90%).

In some embodiments, the object selection system 106 can label the bounding box of a detected query object. For example, upon determining that a potential object in the image correlates with the query object, the object selection system 106 can tag the bounding box of the detected query object with a label matching the query object and/or the object class of the query object. In additional embodiments, the object selection system 106 can also tag the bounding box of the detected query object with a label indicating the determined correlation score for the potential object, which is described above.

The concept embedding neural network can correspond to one or more deep neural networks or models that map visual images and text strings to a shared embedding vector space. For example, the concept embedding neural network can utilize the techniques and approaches found in U.S. Pat. No. 10,216,766, "Large-Scale Image Tagging Using Image-To-Topic Embedding," filed Mar. 20, 2017, which is incorporated herein by reference in its entirety. Alternatively, the concept embedding neural network can utilize the techniques and approaches found in U.S. patent application Ser. No. 15/921,492, "Detecting Objects Using A Weakly Supervised Model," filed Mar. 14, 2018, which is incorporated herein by reference in its entirety. In some embodiments, as described above, the color classification system 106 utilizes a machine-learning concept embedding model rather than the concept embedding neural network.

Upon selecting one or more instances of the detected query object, the object selection system 106 can provide the one or more instances of the detected query object to the object mask network, as described above (e.g., the act 312 of the object selection pipeline 300). In addition, the object selection system 106 can further train the concept embedding neural network to generate an object mask from one or more instances of a detected query object.

Figure 7B:
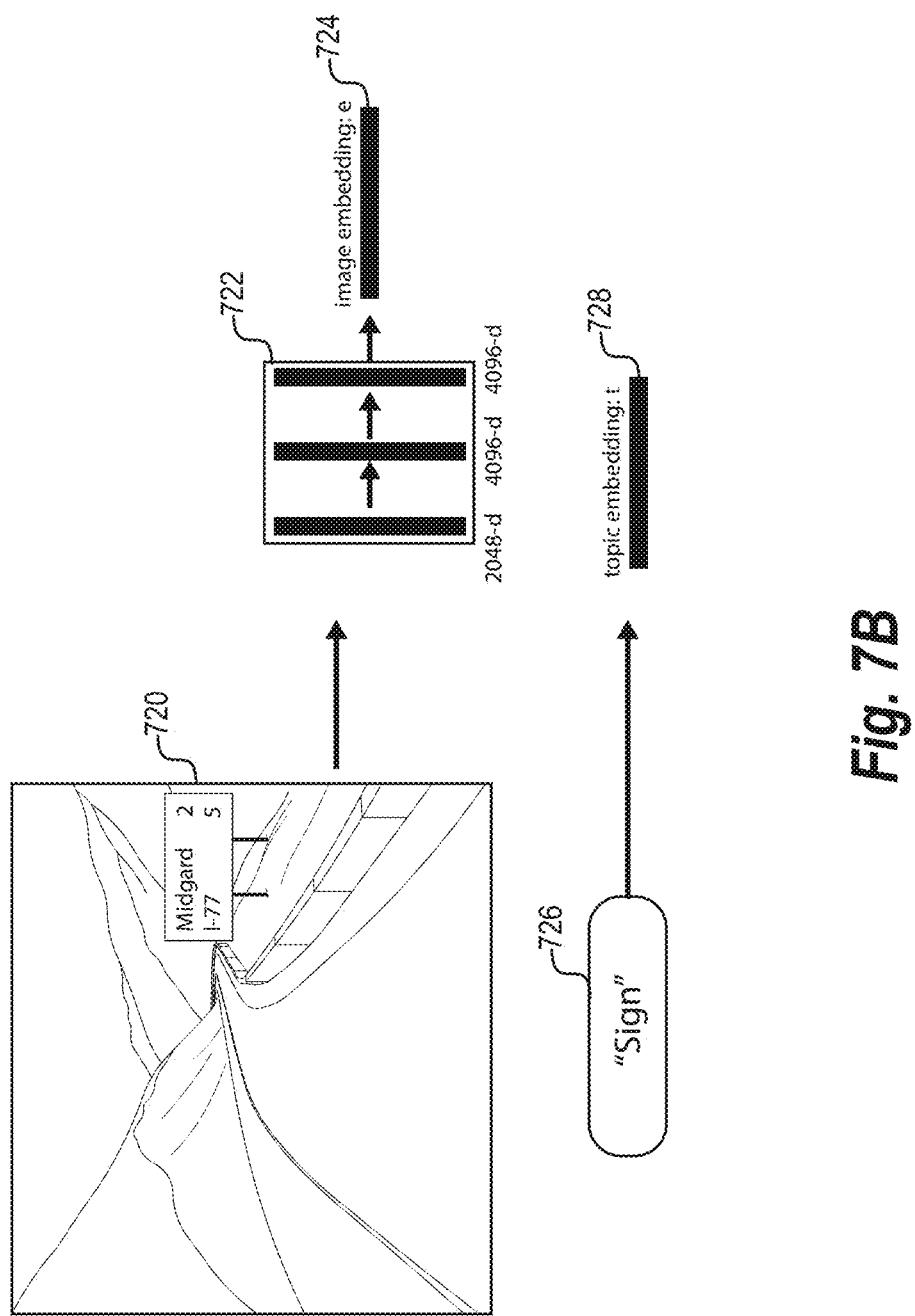
FIG. 7B illustrates a schematic diagram of a concept embedding neural network in accordance with one or more embodiments.

FIG. 7B illustrates one embodiment of a concept embedding neural network. Specifically, as shown the concept embedding neural network can comprise an image embedding neural network 722. For example, the image embedding neural network 722 can comprise a three-layer fully-connected neural network with each fully-connected layer followed by a batch normalization layer and a rectified linear unit ("ReLU") non-linear activation layer. The image embedding neural network 722 can take an image 720 can generate an image embedding 724.

Additionally, the concept embedding neural network can generate a topic embedding 728 from a query string 726. The concept embedding neural network can generate a topic embedding from a query string using a word to vector algorithm or the techniques described in U.S. patent application Ser. No. 15/921,492, "Detecting Objects Using A Weakly Supervised Model." The concept embedding neural network can then compare the image embedding with the topic embedding. For example, the concept embedding neural network can use a cosine similarly loss to compare the image embedding e and the topic embedding t. For example, the concept embedding neural network can use a cosine similarity measure. The concept embedding neural network can repeat this process for each potential object. The concept embedding neural network can then identify the potential object with the highest similarity measure to the topic embedding 724 as the query object.

FIGS. 8A-8D illustrate a graphical user interface 802 that illustrates the object selection system 106 utilizing an unknown object class detection model to detect a query object corresponding to an unknown object class in accordance with one or more embodiments. For ease in explanation, FIGS. 8A-8D include the client device 600 introduced above. For example, the client device 600 includes an image editing application that implements the image editing system 104 that utilizes the object selection system 106.

Figure 8A:
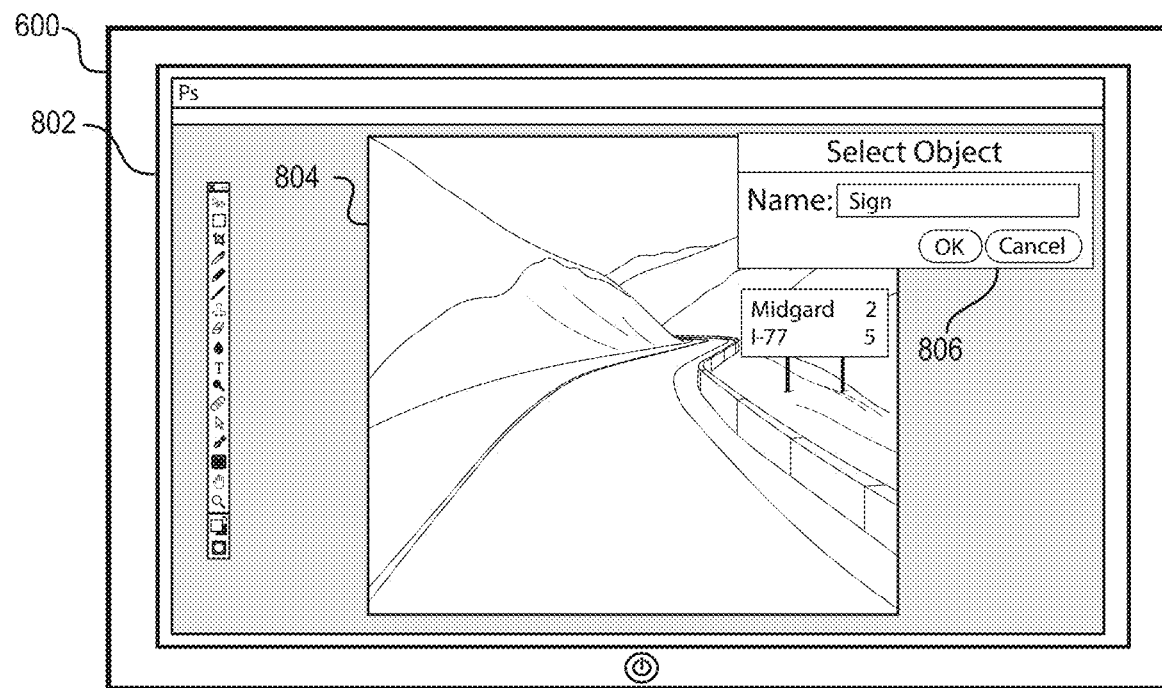
FIGS. 8A-8D illustrate a graphical user interface showing a process of utilizing multiple networks to detect the query object corresponding to an unknown object class in accordance with one or more embodiments.

As shown in FIG. 8A, the graphical user interface 802 includes an image 804 within an image editing application. The image 804 shows a road disappearing through a mountain pass, where a road sign is to the right of the road. As also shown, the image editing application includes various tools (e.g., a vertical toolbar) having selection options as well as other image editing options. In addition, the graphical user interface 802 includes an object selection interface 806, as described above in connection with FIG. 6A, where the user provides the query object of "Sign" within a query string.

As explained previously, upon the user providing the query string, the object selection system 106 can utilize the object selection pipeline 300 to determine how to optimally detect the requested object. In this illustrative example, the object selection system 106 can determine that the query object in the query string is "sign." Based on the query object, the object selection system 106 can determine that the query object does not correspond to a known object class used to train a known object class detection neural network. Accordingly, the object selection system 106 can select and utilize the unknown object class detection model to detect the query object corresponding to an unknown object class (e.g., the act 310 of the object selection pipeline 300).

Figure 8B:
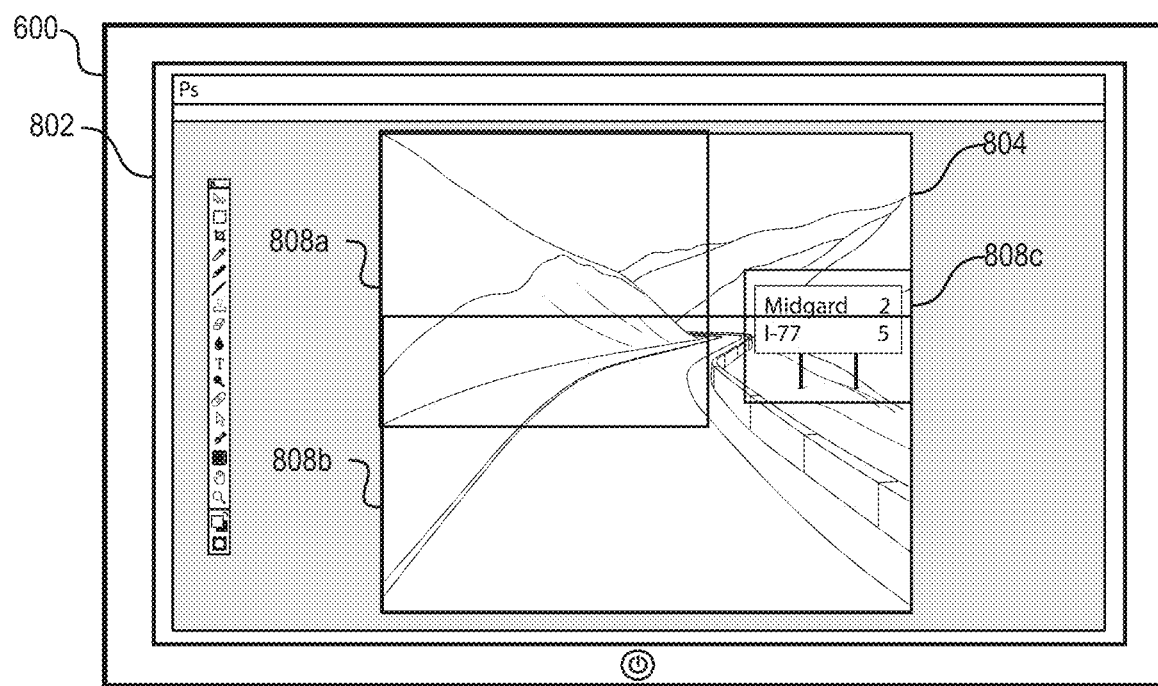

As shown in FIG. 8B, the object selection system 106 can utilize a region proposal neural network (i.e., a region proposal neural network) to identify potential objects 808a-808c within the image 804 (e.g., known objects and/or unknown objects). Upon detecting potential objects within the image 804, the object selection system 106 can generate bounding boxes around the objects (e.g., bounding boxes). However, the object selection system 106 does not tag or label the bounding boxes, as the contents of the boxes are unknown. As shown in FIG. 8B, the object selection system 106 detects three potential objects 808a-808c in the image 804.

Upon determining the potential objects 808a-808c, the object selection system 106 can utilize a concept embedding neural network to identify correlation scores between each of the potential objects 808a-808c and the query object. For example, the object selection system 106 can generate an embedding for each of the potential objects 808a-808c, as well as an embedding for the query object utilizing the concept embedding neural network. Then, the object selection system 106 can compare each of the potential object embeddings to the query object embedding to determine correlation scores, as described above. While not shown, the object selection system 106 can determine a favorable correlation score for the third potential object 808*c* of the sign and the query object of "sign."

Figure 8C:
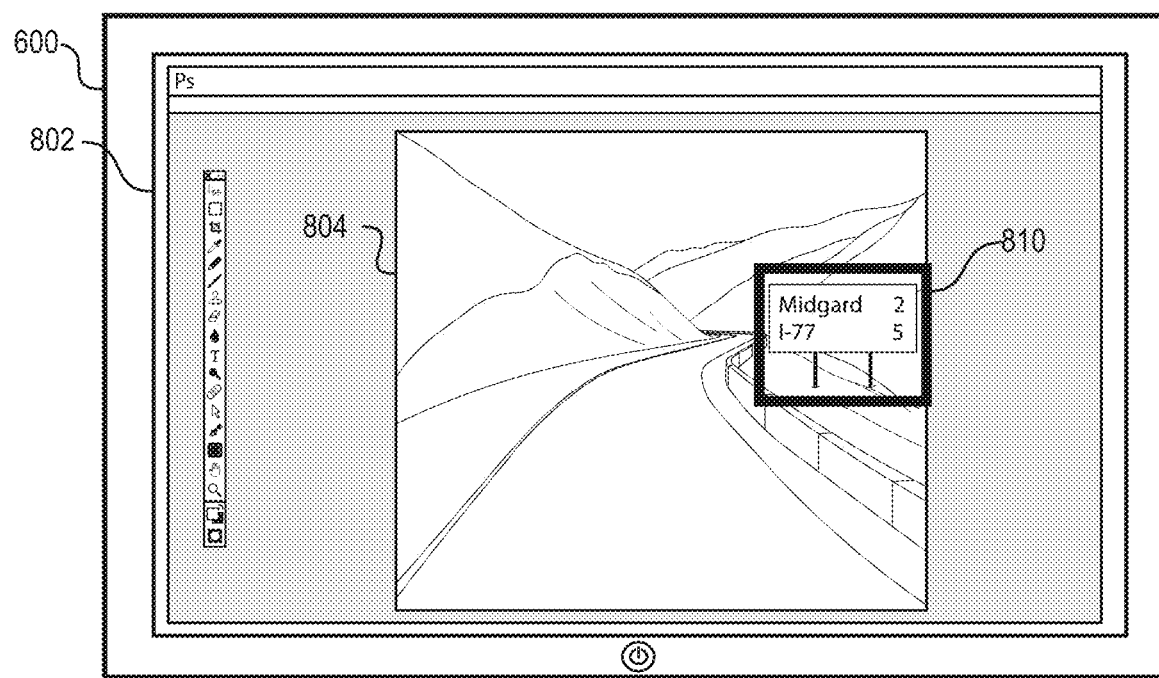

As shown in FIG. 8C, the object selection system 106 selects the third potential object 808*c* as the detected query object 810. As described above, in some embodiments, the object selection system 106 can filter out potential objects 808*a*-808*c* that have low correlation scores to aid in selecting the detected query object. For instance, the object selection system 106 can filter out the first potential object 808*a* and the second potential object 808*b* based on their correlation scores not satisfying a similarity threshold. Here, the object selection system 106 is left to select the remaining potential object—the third potential object 808*c*—as the detected query object 810. Additionally, or in the alternative, the object selection system 106 can select the third potential object 808*c* as the detected query object 810 based on the third potential object 808*c* having the most favorable (e.g., highest) correlation score among the potential objects 808*a*-808*c*.

Figure 8D:
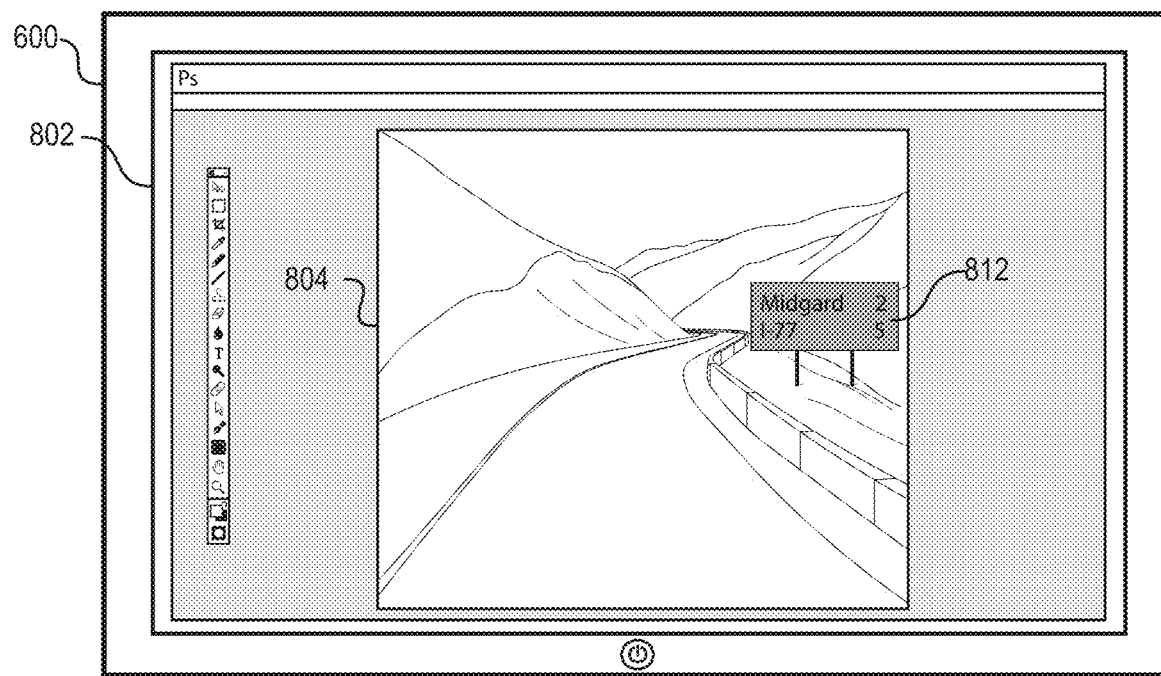

Upon identifying the query object 810, the object selection system 106 can select the object for the user. To illustrate, FIG. 8D shows the object selection system 106 automatically selecting the detected query object 810. In particular, as described above, the object selection system 106 can provide the detected query object 810 to an object mask neural network and/or generate an object mask of the detected query object 810, resulting in a selected query object 812. Further, the object selection system 106 can provide the selected query object 812 to a user. Indeed, as shown in FIG. 8D, the object selection system 106 automatically selects the sign for the user within the image editing application.

Notably, FIGS. 8B and 8C show the object selection system 106 utilizing the region proposal neural network and the concept embedding neural network to detect the query object (e.g., the unknown object class detection model). In many embodiments, the object selection system 106 does not display corresponding actions to the user. Rather, the object selection system 106 appears to automatically detect and accurately select the query object in response to the user's query string request (e.g., the graphical user interface 802 jumps from FIG. 8A to FIG. 8D).

FIGS. 7-8D describe various embodiments of detecting a query object in one or more digital images utilizing an unknown object class detection model. Accordingly, the actions, algorithms, and models described in connection with FIGS. 7-8D provide example structure and architecture for performing a step for detecting the query object in one or more digital images utilizing an unknown object class model.

Figure 9:
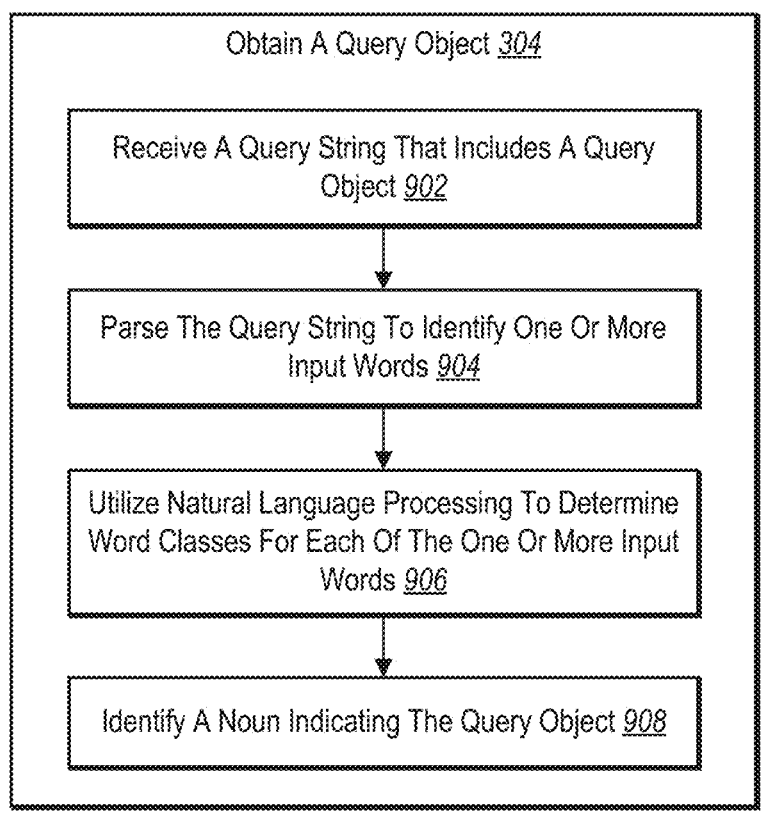
FIG. 9 illustrates a flow chart of analyzing a query string to identify a query object in accordance with one or more embodiments.

Turning now to the next figure, FIG. 9 illustrates a flow chart of obtaining a query object in accordance with one or more embodiments. As mentioned above, FIG. 9 corresponds to the act 304 of the object selection pipeline 300 described above in connection with FIG. 3. In particular, FIG. 9 includes various acts 902-908 that provide additional detail regarding the act 306 of the object selection pipeline 300.

As shown, the act 306 can include the act 902 of the object selection system 106 receiving a query string that includes a query object. For example, the object selection system 106 can provide an object selection interface (e.g., shown in FIG. 6A) where a user can enter one or more words indicating the object that they would like the object selection system to automatically select. As described above, in some embodiments, the object selection system 106 can enable alternative forms of user input, such as audio input telling the object selection system 106 to select an object in the image.

As shown, the act 306 can include the act 904 of the object selection system 106 parsing the query string to identify one or more input words. For example, in various embodiments, the object selection system 106 separates the query string into individual words. For instance, the object selection system 106 assigns each word in the query string to an element of a vector that corresponds to the query string. Also, as mentioned above, in some embodiments, the query string is made up of a single word.

As also shown, the act 306 can include the act 906 of the object selection system 106 utilizing natural language processing to determine word classes for each of the one or more input words. Indeed, upon parsing out each word in the query string, the object selection system 106 can classify and assign each input word in the query string to a word classes. In various embodiments, word classes include parts of speech (e.g., nouns, proper nouns, verbs, articles, adjectives, adverbs, pronouns, prepositions, or conjunctions).

In one or more embodiments, the object selection system 106 can utilize a machine-learning model trained based on natural language processing to identify the word class of each word in the query string. For example, the object selection system 106 trains and/or utilizes a long-short-term memory (LSTM) neural network to identify the word class for each of the words in the query string. In alternative embodiments, the object selection system 106 can utilize other methods to determine the word class for input words in the query string.

As shown, the act 306 can include the act 908 of the object selection system 106 identifying a noun indicating the query object. More specifically, upon assigning word classes for each of the words, the object selection system 106 can identify a noun in the query string. Primarily, the noun in the query string corresponds to the query object. Often, when the query string includes a single word, the word is a noun corresponding to the query object.

In some instances, the query string includes multiple nouns. In these instances, the object selection system 106 can determine if the two nouns are connected to indicate a single query object (e.g., "German" and "Shepard"). In alternative embodiments, the object selection system 106 can determine whether the query string includes multiple query objects for the object selection system 106 to automatically select.

Similarly, in one or more embodiments, the object selection system 106 can filter out words of the query string, such as articles (e.g., "the," "a," "an"). In some embodiments, the object selection system 106 can identify conjunctions, which indicate the possibility of multiple query objects being requests and/or multiple object attributes being provided. Similarly, in some embodiments, the object selection system 106 identifies negative words, such as the "not," "except," or "without," which can indicate exclusion of a particular object when selecting the query object.

Figure 10:
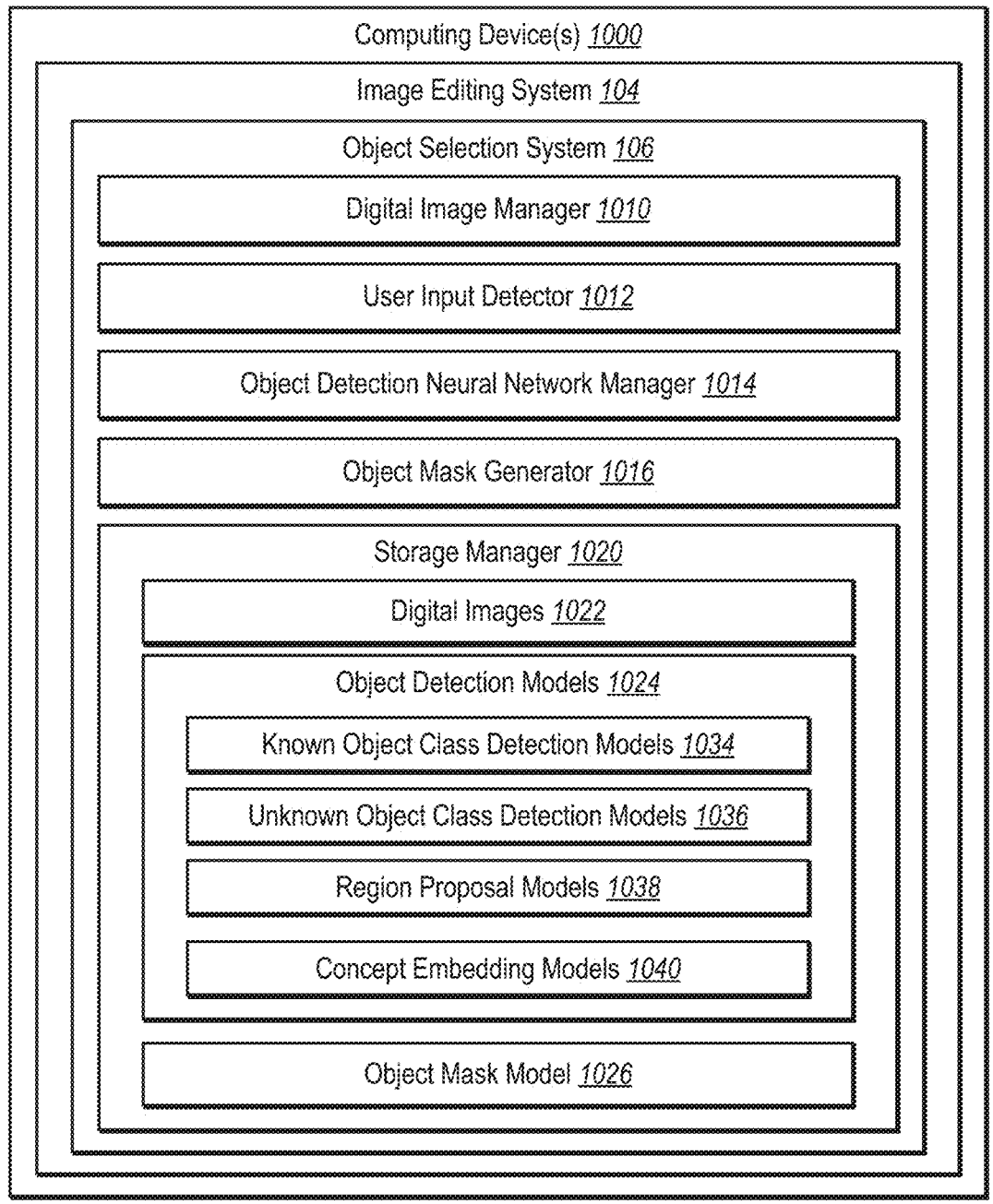
FIG. 10 illustrates a schematic diagram of the object selection system in accordance with one or more embodiments.

Referring now to FIG. 10, additional detail is provided regarding capabilities and components of the object selection system 106 in accordance with one or more embodiments. In particular, FIG. 10 shows a schematic diagram of an example architecture of the object selection system 106 implemented within the image editing system 104 and hosted on a computing device(s) 1000. The image editing system 104 can correspond to the image editing system 104 described previously in connection with FIG. 1.

As shown, the object selection system 106 is located on a computing device(s) 1000 within an image editing system 104. In general, the computing device(s) 1000 may represent various types of client devices. For example, in some embodiments, the client is a mobile device, such as a laptop, a tablet, a mobile telephone, a smartphone, etc. In other embodiments, the computing device(s) 1000 is a non-mobile device, such as a desktop or server, or another type of client device. Additional details with regard to the computing device(s) 1000 are discussed below as well as with respect to FIG. 12.

As illustrated in FIG. 10, the object selection system 106 includes various components for performing the processes and features described herein. For example, the object selection system 106 includes a digital image manager 1010, a user input detector 1012, an object detection neural network manager 1014, an object mask generator 1016, and a storage manager 1020. As shown, the storage manager 1020 includes digital images 1022, object detection neural networks 1024, and an object mask model 1026. Each of the components mentioned above is described below in turn.

As mentioned above, the object selection system 106 includes the digital image manager 1010. In general, the digital image manager 1010 facilitates identifying, accessing, receiving, obtaining, generating, importing, exporting, copying, modifying, removing, and organizing images. In one or more embodiments, the digital image manager 1010 operates in connection with an image editing system 104 (e.g., an image editing application) to access and edit images, as described previously. In some embodiments, the digital image manager 1010 communicates with the storage manager 1020 to store and retrieve the digital images 1022, for example, within a digital image database managed by the storage manager 1020.

As shown, the object selection system 106 includes the user input detector 1012. In various embodiments, the user input detector 1012 can detect, receive, and/or facilitate user input on the computing device(s) 1000 in any suitable manner. In some instances, the user input detector 1012 detects one or more user interactions (e.g., a single interaction, or a combination of interactions) with respect to a user interface. For example, the user input detector 1012 detects a user interaction from a keyboard, mouse, touch page, touch screen, and/or any other input device in connection with the computing device(s) 1000. For instance, the user input detector 1012 detects user input of a query string submitted from an object selection interface requesting automatic selection of an object within an image.

As shown, the object selection system 106 includes the object detection neural network manager 1014. In various embodiments, the object detection neural network manager 1014 maintains, creates, generates, trains, updates, accesses, and/or utilizes the object detection neural networks disclosed herein. As described above, the object detection neural network manager 1014 detects one or more objects within an image (e.g., a query object) and generates an approximate boundary (e.g., a bounding box) to indicate the detected object.

In addition, in a number of embodiments, the object detection neural network manager 1014 can communicate with the storage manager 1020 to store, access, and utilize the object detection neural models 1024. In various embodiments, the object detection neural networks 1024 include one or more known object class detection models 1034 (e.g., known object class detection models neural networks), unknown object class detection models 1036 (e.g., unknown object class detection neural networks), models 1038 (e.g., region proposal neural networks), and concept embedding models 1040 (e.g., concept embedding neural networks), each of which are described above in detail.

In addition, as shown, the object selection system 106 includes the object mask generator 1016. In one or more embodiments, the object mask generator 1016 produces, creates, and/or generates accurate object masks from detected objects. For example, the object detection neural network manager 1014 provides a boundary of an object (e.g., a detected query object) to the object mask generator 1016, which utilizes the object mask model 1026 (e.g., object mask neural network) to generate an object mask of the detected object, as described above. As also explained above, in various embodiments, the object mask generator 1016 generates multiple object masks when multiple instances of the query object are detected.

Each of the components 1010-1040 of the object selection system 106 can include software, hardware, or both. For example, the components 1010-1040 can include one or more instructions stored on a computer-readable storage medium and executable by processors of one or more computing devices, such as a client device (e.g., a mobile client device) or server device. When executed by the one or more processors, the computer-executable instructions of the object selection system 106 can cause a computing device to perform the feature learning methods described herein. Alternatively, the components 1010-1040 can include hardware, such as a special-purpose processing device to perform a certain function or group of functions. In addition, the components 1010-1040 of the object selection system 106 can include a combination of computer-executable instructions and hardware.

Furthermore, the components 1010-1040 of the object selection system 106 may be implemented as one or more operating systems, as one or more stand-alone applications, as one or more modules of an application, as one or more plug-ins, as one or more library functions or functions that may be called by other applications, and/or as a cloud-computing model. Thus, the components 1010-1040 may be implemented as a stand-alone application, such as a desktop or mobile application. Additionally, the components 1010-1040 may be implemented as one or more web-based applications hosted on a remote server. The components 1010-1040 may also be implemented in a suite of mobile device applications or "apps." To illustrate, the components 1010-1040 may be implemented in an application, including but not limited to ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Systems Incorporated in the United States and/or other countries.

FIGS. 1-10, the corresponding text, and the examples provide a number of different methods, systems, devices, and non-transitory computer-readable media of the object selection system 106. In addition to the foregoing, one or more embodiments can also be described in terms of flowcharts comprising acts for accomplishing a particular result, such as the flowcharts of acts shown in FIG. 11. Additionally, the acts described herein may be repeated or performed in parallel with one another or parallel with different instances of the same or similar acts.

Figure 11:
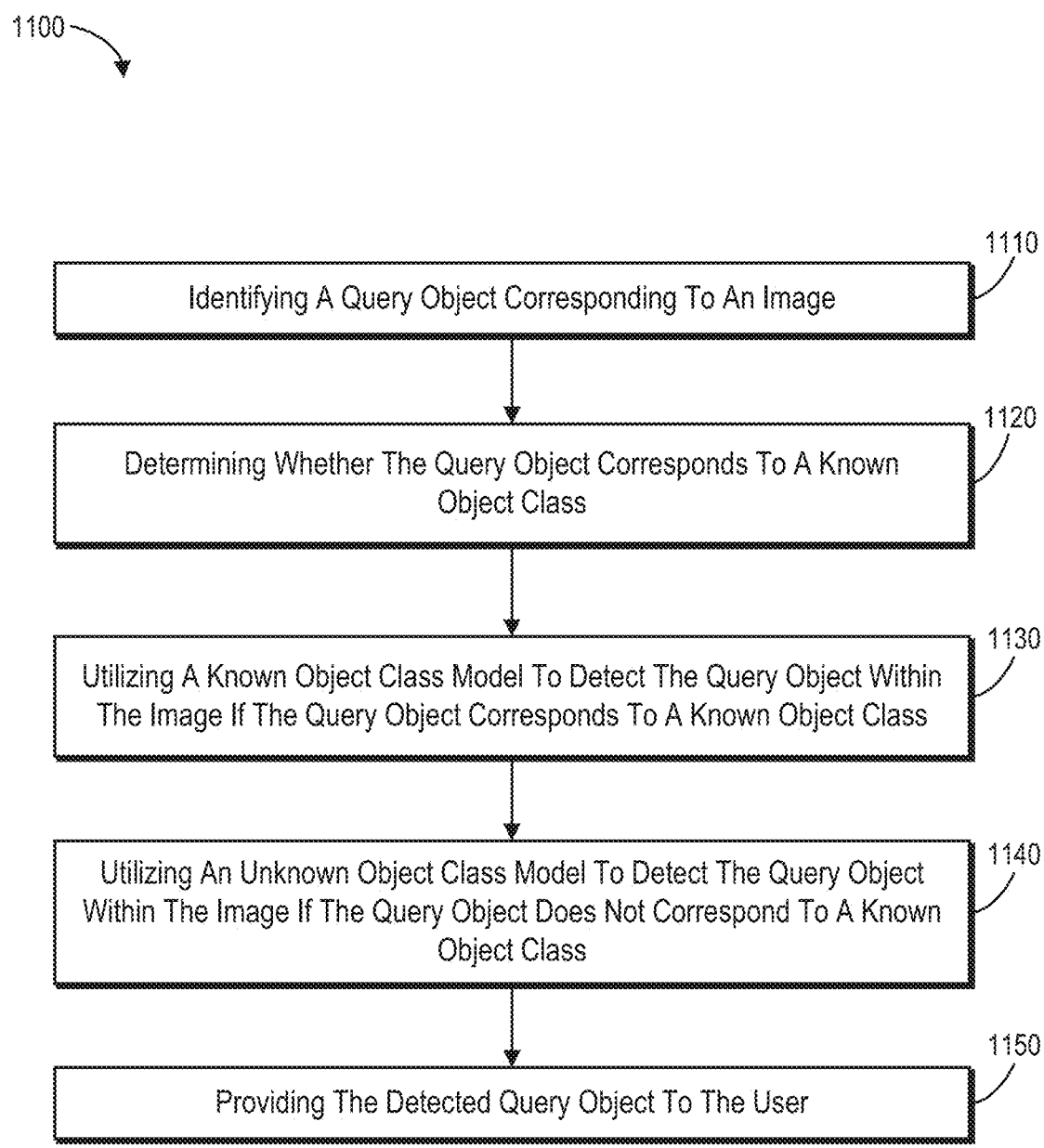
FIG. 11 illustrates a flowchart of a series of acts for utilizing one of multiple object detection neural networks to detect a query object in accordance with one or more embodiments.

As mentioned, FIG. 11 illustrates a flowchart of a series of acts 1100 for utilizing one of multiple object detection neural networks to detect a query object in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

In one or more embodiments, the series of acts 1100 is implemented on one or more computing devices, such as the client device 102, the server device(s) 110, the client device 600, or the computing device(s) 1000. In addition, in some embodiments, the series of acts 1100 is implemented in a digital environment for creating or editing digital content (e.g., digital images). For example, the series of acts 1100 is implemented on a computing device having memory that includes a digital image; a known object class detection neural network including a region proposal neural network and an object classification neural network as well as an unknown object class detection neural network including a region proposal neural network and a concept embedding neural network.

The series of acts 1100 includes an act 1110 of identifying a query object corresponding to an image. In particular, the act 1110 can involve identifying a query that comprises a query object to be detected in one or more digital images. In some embodiments, the act 1110 also includes analyzing a query string to identify a noun indicating the query object. In example embodiments, the act 1110 includes receiving text input from the user associated with a client device and identifying the text input as the query string. In alternative embodiments, the act 1110 includes receiving audio input from the user associated with the client device, converting the audio input into text, and identifying the converted text as the query string. Furthermore, in one or more embodiments, the query comprises an image search request to find images having the query object. In alternative embodiments, the query comprises a selection query to select one or more instances of the query object in a digital image.

As shown, the series of acts 1100 also includes an act 1120 of determining whether the query object corresponds to a known object class. In particular, the act 1120 can involve determining whether the query object corresponds to a known object class based on comparing the query object to known object classes. For example, in various embodiments, the act 1120 can further include analyzing the noun(s) identified in the query string to determine that the query object corresponds to a known object class. In one or more embodiments, the act 1120 can include determining that the query object does not correspond to a known object class.

As shown in FIG. 11, the series of acts 1100 further includes an act 1130 of utilizing a known object class model to detect the query object within the image if the query object corresponds to a known object class. In particular, the act 1130 can include utilizing a known object class detection model to detect the query object within the one or more digital images based on determining that the query object corresponds to the known object class. In some embodiments, the known object class detection model is a known object class neural network. In alternative embodiments, the known object class detection model is another type of machine-learning model.

In one or more embodiments, the act 1130 can include detecting potential objects in the one or more digital image utilizing a region proposal model and generating approximate boundaries about the potential objects. Act 1130 can further involve generating an object label for the potential objects utilizing an object classification model. Act 1130 can further involve determining that an object label of one or more potential objects corresponds to a query object class corresponding to the query object. In some embodiments, the object classification model is an object classification neural network. In alternative embodiments, the object classification model is another type of machine-learning model.

In various embodiments, the act 1130 can include determining that an object label of at least one potential object does not correspond to the query object. Act 1130 can further involve filtering out the at least one potential object based on the object label of the at least one potential object not corresponding to the query object.

As shown, the series of acts 1100 also includes an act 1140 of utilizing an unknown object class model to detect the query object within the image if the query object does not correspond to a known object class. In particular, the act 1140 can include utilizing a concept embedding model to detect the query object within the one or more digital images based on determining that the query object does not correspond to a known object class.

In some embodiments, the act 1140 can include detecting potential objects in the one or more digital image utilizing a region proposal neural network or other type of machine-learning region proposal model. Act 1140 can also involve generating approximate boundaries around the potential objects. Act 1140 can also involve generating a correlation score for each of the potential objects relative to the query object utilizing the concept embedding neural network or other type of machine-learning concept embedding model. Furthermore, act 1140 can involve selecting at least one potential object of the plurality of potential objects as an instance of the query object based on the correlation scores. In particular, act 1140 can involve generating image embeddings for each of the potential objects utilizing the concept embedding neural network, generating a topic embedding for the query object utilizing the concept embedding neural network, and generating the correlation score for each of the potential objects by comparing the topic embedding with the image embeddings As shown, the series of acts 1100 also includes an act 1150 of providing the detected query object to the user. In particular, the act 1150 can involve providing an indication of detected query object in the one or more digital images in response to the query. In some embodiments, the act 1150 includes automatically selecting the detected query object by generating an object mask for each detected instance of the query object utilizing an object mask neural network or other type of machine-learning object mask model. In one or more embodiments, act 1150 involves returning a subset of the one or more digital images including the query object.

The series of acts 1100 can also include a number of additional acts. In one or more embodiments, the series of acts 1100 can include the acts of identifying multiple separate instances of the query object in the digital image, where providing the detected query object within the digital image includes selecting the multiple separate instances of the detected query object within the digital image. In some embodiments, the In additional embodiments, the series of acts 1100 can include the act of detecting a potential object in the image utilizing a region proposal neural network or other type of machine-learning region proposal model and generating a bounding box around edges of the potential object.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the object selection system to create, execute, and/or modify the object selection pipeline as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer correctly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
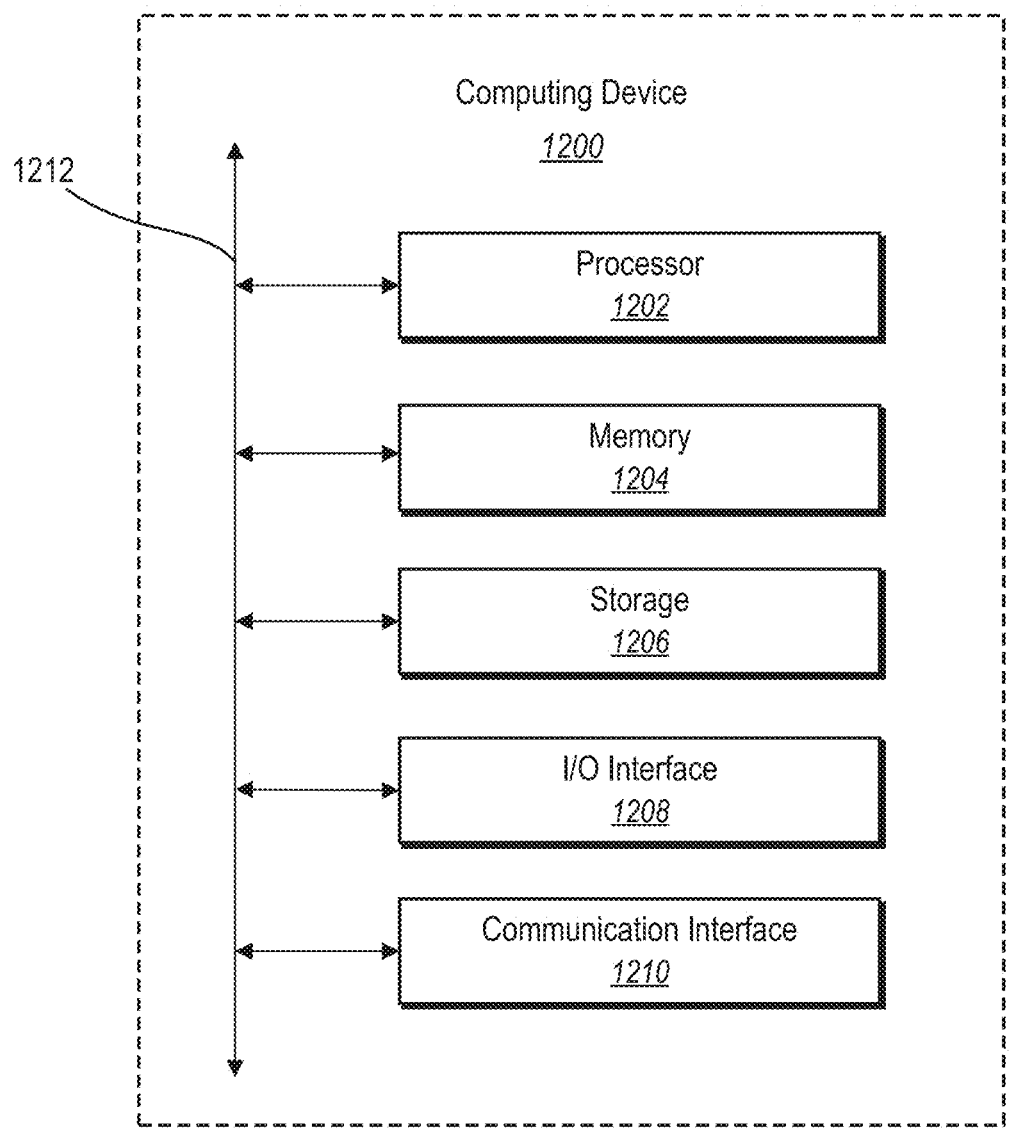
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., client device 102, the server device(s) 110, the client device 600, or the computing device(s) 1000). In one or more embodiments, the computing device 1200 may be a mobile device (e.g., a laptop, a tablet, a smartphone, a mobile telephone, a camera, a tracker, a watch, a wearable device, etc.). In some embodiments, the computing device 1200 may be a non-mobile device (e.g., a desktop computer, a server device, a web server, a file server, a social networking system, a program server, an application store, or a content provider). Further, the computing device 1200 may be a server device that includes cloud-based processing and storage capabilities.

As shown in FIG. 12, the computing device 1200 can include one or more processor(s) 1202, memory 1204, a storage device 1206, input/output ("I/O") interfaces 1208, and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory. In one or more embodiments, the memory 1204 is a memory device (e.g., hardware) capable of storing computer readable instructions, algorithms, data, images, neural networks, etc.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (e.g., user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of these I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
    identify a query that comprises a query object identification label indicating a query object to be detected in one or more digital images;
    determine which path of a multi-path object detection pipeline comprising a first path for known objects and a second path for unknown objects to use for detecting the query object in the one or more digital images by:
        determining whether the query object corresponds to a known object class by comparing the query object identification label to known object class labels; and
        selecting, based on determining whether the query object corresponds to a known object class, an object class detection neural network from among a set of possible object class detection neural networks for classifying the query object, wherein the set of possible object class detection neural networks comprises:
  a known object class detection neural network that determines classifications indicating known objects; and
  an unknown object class detection neural network that determines classifications indicating unknown objects;
based on determining that the query object corresponds to the known object class, select the first path of the multi-path object detection pipeline and utilize the known object class detection neural network to detect the query object within the one or more digital images;
based on determining that the query object does not correspond to a known object class, select the second path of the multi-path object detection pipeline and utilize the unknown object class detection neural network comprising a concept embedding neural network that determines a correspondence between the query object identification label and potential query objects within the one or more digital images to detect the query object within the one or more digital images; and
provide an indication of a detected query object corresponding to the query object in the one or more digital images in response to the query.

2. The non-transitory computer-readable medium of claim 1, wherein the instructions, when executed by the at least one processor, cause the computing device to utilize the known object class detection neural network to detect the query object within the one or more digital images by:
  detecting potential objects in the one or more digital images utilizing a region proposal neural network; and
  generating approximate boundaries about the potential objects.

3. The non-transitory computer-readable medium of claim 2, wherein the instructions, when executed by the at least one processor, cause the computing device to utilize the known object class detection neural network to detect the query object within the one or more digital images by generating object labels for the potential objects utilizing an object classification neural network.

4. The non-transitory computer-readable medium of claim 3, wherein the instructions, when executed by the at least one processor, cause the computing device to utilize the known object class detection neural network to detect the query object within the one or more digital images by determining that an object label of one or more potential objects corresponds to a query object class associated with the query object.

5. The non-transitory computer-readable medium of claim 4, further comprising instructions that when executed by the at least one processor, cause the computing device to generate an object mask for each detected instance of the query object utilizing an object mask model.

6. The non-transitory computer-readable medium of claim 3, further comprising instructions that when executed by the at least one processor, cause the computing device to:
  determine that an object label of at least one potential object does not correspond to the query object identification label; and
  filter out the at least one potential object based on the object label of the at least one potential object not corresponding to the query object identification label.

7. The non-transitory computer-readable medium of claim 1, wherein the instructions, when executed by the at least one processor, cause the computing device to utilize the concept embedding neural network to detect the query object within the one or more digital images by:
  detecting potential objects in the one or more digital images utilizing a region proposal neural network jointly with the concept embedding neural network; and
  generating approximate boundaries around the potential objects.

8. The non-transitory computer-readable medium of claim 7, wherein the instructions, when executed by the at least one processor, cause the computing device to utilize the concept embedding neural network to detect the query object within the one or more digital images by:
  generating a correlation score for each of the potential objects relative to the query object identification label utilizing the concept embedding neural network; and
  selecting at least one potential object of the potential objects as an instance of the query object based on the correlation scores.

9. The non-transitory computer-readable medium of claim 8, wherein the instructions, when executed by the at least one processor, cause the computing device to utilize the concept embedding neural network to detect the query object within the one or more digital images by generating image embeddings for each of the potential objects utilizing the concept embedding neural network.

10. The non-transitory computer-readable medium of claim 9, wherein the instructions, when executed by the at least one processor, cause the computing device to utilize the concept embedding neural network to detect the query object within the one or more digital images by generating a topic embedding for the query object identification label utilizing the concept embedding neural network.

11. The non-transitory computer-readable medium of claim 10, wherein the instructions, when executed by the at least one processor, cause the computing device to generate the correlation score for each of the potential objects by comparing the topic embedding with the image embeddings.

12. A system for automatically selecting objects within digital images comprising:
  one or more memory devices comprising:
    one or more digital images;
    a region proposal neural network;
    an object classification neural network; and
    a concept embedding neural network that determines a correspondence between queries and query objects in digital images; and
  one or more servers that cause the system to:
    identify a query that comprises a query object identification label indicating a query object to be detected in the one or more digital images;
    determine which path of a multi-path object detection pipeline comprising a first path for known objects and a second path for unknown objects to use for detecting the query object in the one or more digital images by:
      determining whether the query object corresponds to a known object class by comparing the query object identification label to known object class labels; and
    selecting, based on determining whether the query object corresponds to a known object class, an object class detection neural network from among a set of possible object class detection neural networks for classifying the query object, wherein the set of possible object class detection neural networks comprises:
a known object class detection neural network that determines classifications indicating known objects; and
an unknown object class detection neural network that determines classifications indicating unknown objects;
detect a plurality of potential objects in the one or more digital images utilizing the region proposal neural network;
based on determining that the query object corresponds to the known object class, select the first path of the multi-path object detection pipeline and utilize the object classification neural network to detect the query object within the one or more digital images by determining object classifications for the plurality of potential objects;
based on determining that the query object does not correspond to the known object class, select the second path of the multi-path object detection pipeline and utilize the unknown object class detection neural network comprising the concept embedding neural network to detect the query object within the one or more digital images by determining a correspondence between the query object identification label and each of the plurality of potential objects; and
provide an indication of a detected query object corresponding to the query object in the one or more digital images in response to the query.

13. The system of claim 12, wherein the query comprises an image search request and the one or more servers cause the system to provide the indication of detected query object in the one or more digital images in response to the query by returning a subset of the one or more digital images including the query object.

14. The system of claim 12, wherein:
the query comprises a selection query indicating selections of one or more digital object instances within a query digital image; and
the one or more servers cause the system to:
provide the indication of the detected query object in the one or more digital images in response to the query by returning a selection of one or more detected instances of the query object in at least one digital image of the one or more digital images; and
generate an object mask for the one or more detected instances of the query object in the at least one digital image utilizing an object mask model.

15. The system of claim 12, wherein the one or more servers cause the system to determine the known object class labels from labels of objects used to generate the object classification neural network.

16. The system of claim 12, wherein the one or more servers cause the system to utilize the concept embedding neural network to detect the query object within the one or more digital images by:
generating image embeddings for each of the plurality of potential objects utilizing the concept embedding neural network;
generating a topic embedding for the query object identification label utilizing the concept embedding neural network; and comparing the topic embedding with the image embeddings.

17. The system of claim 16, wherein the one or more servers cause the system to determine one or more potential objects with object classifications that correspond to the query object identification label.

18. In a digital medium environment for creating or editing digital images, a computer-implemented method of selecting query objects, comprising:
identifying a query that comprises a query object identification label indicating a query object to be detected in one or more digital images;
determine which path of a multi-path object detection pipeline comprising a first path for known objects and a second path for unknown objects to use for detecting the query object in the one or more digital images by:
determining whether the query object corresponds to a known object class by comparing the query object identification label to known object class labels; and
selecting, based on determining whether the query object corresponds to a known object class, an object class detection neural network from among a set of possible object class detection neural networks for classifying the query object, wherein the set of possible object class detection neural networks comprises:
a known object class detection neural network that determines classifications indicating known objects; and
an unknown object class detection neural network that determines classifications indicating unknown objects;
based on determining that the query object corresponds to a known object class, selecting the first path of the multi-path object detection pipeline and utilizing the known object class detection neural network to detect the query object within the one or more digital images;
based on determining that the query object does not correspond to a known object class, selecting the second path of the multi-path object detection pipeline and utilizing the unknown object class detection neural network comprising a concept embedding neural network that determines a correspondence between the query object identification label and potential query objects within the one or more digital images to detect the query object within the one or more digital images; and
providing an indication of one or more instances of a detected query object corresponding to the query object within the one or more digital images in response to the query.

19. The computer-implemented method of claim 18, wherein providing the indication of one or more instances of the detected query object comprises automatically selecting an instance of the detected query object within a digital image of the one or more digital images without selecting other areas in the digital image.

20. The computer-implemented method of claim 19, further comprising generating an object mask for the one or more instances of the detected query object in the one or more digital images.

* * * * *